US010676205B2

(12) United States Patent
Niergarth et al.

(10) Patent No.: US 10,676,205 B2
(45) Date of Patent: Jun. 9, 2020

(54) PROPULSION ENGINE FOR AN AIRCRAFT

(71) Applicant: General Electric Company, Schenectady, NY (US)

(72) Inventors: Daniel Alan Niergarth, Cincinnati, OH (US); Randy M. Vondrell, Cincinnati, OH (US); Brandon Wayne Miller, Liberty Township, OH (US); Patrick Michael Marrinan, Mason, OH (US); Lawrence Chih-hui Cheung, Niskayuna, NY (US); Nikolai N. Pastouchenko, Glenville, NY (US)

(73) Assignee: General Electric Company, Schenectady, NY (US)

( * ) Notice: Subject to any disclaimer, the term of this patent is extended or adjusted under 35 U.S.C. 154(b) by 897 days.

(21) Appl. No.: 15/241,157

(22) Filed: Aug. 19, 2016

(65) Prior Publication Data
US 2018/0050810 A1 Feb. 22, 2018

(51) Int. Cl.
*B64D 33/08* (2006.01)
*F02K 5/00* (2006.01)
(Continued)

(52) U.S. Cl.
CPC ............ *B64D 33/08* (2013.01); *B64C 11/001* (2013.01); *B64C 21/06* (2013.01); *B64D 27/10* (2013.01);
(Continued)

(58) Field of Classification Search
CPC ........ B64D 27/14; B64D 27/20; B64D 27/24; B64D 2027/026; F05C 2220/323; F05C 2260/213; F05C 2260/98
(Continued)

(56) References Cited

U.S. PATENT DOCUMENTS 2,812,912 A 11/1957 Stevens et al.
3,286,470 A 11/1966 Gerlaugh
(Continued)

FOREIGN PATENT DOCUMENTS

CA 2917616 A1 * 7/2016 ............ B64D 27/18
EP 2 966 266 A1 1/2016
(Continued)

OTHER PUBLICATIONS http://aviationweek.com/awin/boeing-researches-alternative-propulsion-and-fuel-options, Aviation Week & Space Technology, Jun. 4, 2012.
(Continued)

*Primary Examiner* — Christopher P Ellis
(74) *Attorney, Agent, or Firm* — Dority & Manning, P.A.

(57) ABSTRACT

A propulsion system for an aircraft includes an electric propulsion engine. The electric propulsion engine includes an electric motor and a fan rotatable about a central axis of the electric propulsion engine by the electric motor. The electric propulsion engine also includes a bearing supporting rotation of the fan and a thermal management system. The thermal management system includes a lubrication oil circulation assembly and a heat exchanger thermally connected to the lubrication oil circulation assembly. The lubrication oil circulation assembly is configured for providing the bearing with lubrication oil. Such an electric propulsion engine may be a relatively self-sufficient engine.

15 Claims, 11 Drawing Sheets

(51) Int. Cl.
| | |
|---|---|
| *F02C 7/14* | (2006.01) |
| *F02C 6/20* | (2006.01) |
| *B64C 11/00* | (2006.01) |
| *B64C 21/06* | (2006.01) |
| *B64D 27/10* | (2006.01) |
| *B64D 27/24* | (2006.01) |
| *F01D 15/10* | (2006.01) |
| *F01D 15/12* | (2006.01) |
| *F02K 3/062* | (2006.01) |
| *F04D 29/056* | (2006.01) |
| *F04D 29/063* | (2006.01) |
| *F04D 29/32* | (2006.01) |
| *F04D 29/58* | (2006.01) |
| *B64D 27/02* | (2006.01) |

(52) U.S. Cl.
CPC ............ *B64D 27/24* (2013.01); *F01D 15/10* (2013.01); *F01D 15/12* (2013.01); *F02C 6/206* (2013.01); *F02C 7/14* (2013.01); *F02K 3/062* (2013.01); *F02K 5/00* (2013.01); *F04D 29/056* (2013.01); *F04D 29/063* (2013.01); *F04D 29/325* (2013.01); *F04D 29/582* (2013.01); *B64D 2027/026* (2013.01); *F05D 2220/323* (2013.01); *F05D 2260/213* (2013.01); *F05D 2260/98* (2013.01); *Y02T 50/676* (2013.01)

(58) Field of Classification Search
USPC .......................................................... 244/58
See application file for complete search history.

(56) References Cited

U.S. PATENT DOCUMENTS

| | | |
|---|---|---|
| 3,312,448 A | 4/1967 | Hull, Jr. et al. |
| 3,332,242 A | 7/1967 | Douglas |
| 3,844,110 A | 10/1974 | Widlansky et al. |
| 4,089,493 A | 5/1978 | Paulson |
| 4,605,185 A | 8/1986 | Reyes |
| 4,913,380 A | 4/1990 | Verdaman et al. |
| 5,125,597 A | 6/1992 | Coffinbeny |
| 5,269,135 A * | 12/1993 | Vermejan ............... F02C 7/04 60/226.1 |
| 5,927,644 A | 7/1999 | Ellis et al. |
| 6,092,360 A | 7/2000 | Hoag et al. |
| 6,264,003 B1 | 7/2001 | Dong et al. |
| 6,651,929 B2 | 11/2003 | Dionne |
| 6,976,655 B2 | 12/2005 | Thompson |
| 7,000,404 B2 | 2/2006 | Palmisano et al. |
| 7,267,300 B2 | 9/2007 | Heath et al. |
| 7,387,189 B2 | 6/2008 | James et al. |
| 7,493,754 B2 | 2/2009 | Moniz et al. |
| 7,665,689 B2 | 2/2010 | McComb |
| 7,752,834 B2 | 7/2010 | Addis |
| 7,806,363 B2 | 10/2010 | Udall et al. |
| 7,819,358 B2 | 10/2010 | Belleville |
| 7,905,449 B2 | 3/2011 | Cazals et al. |
| 7,976,273 B2 | 7/2011 | Suciu et al. |
| 8,033,094 B2 | 10/2011 | Suciu et al. |
| 8,099,944 B2 | 1/2012 | Foster et al. |
| 8,109,073 B2 | 2/2012 | Foster et al. |
| 8,128,019 B2 | 3/2012 | Annati et al. |
| 8,162,254 B2 | 4/2012 | Roche |
| 8,220,739 B2 | 7/2012 | Cazals |
| 8,226,040 B2 | 7/2012 | Neto |
| 8,291,716 B2 | 10/2012 | Foster et al. |
| 8,317,126 B2 | 11/2012 | Harris et al. |
| 8,469,306 B2 | 6/2013 | Kuhn, Jr. |
| 8,492,920 B2 | 7/2013 | Huang et al. |
| 8,499,544 B2 | 8/2013 | Shafer et al. |
| 8,549,833 B2 | 10/2013 | Hyde et al. |
| 8,552,575 B2 | 10/2013 | Teets et al. |
| 8,596,036 B2 | 12/2013 | Hyde et al. |
| 8,640,439 B2 | 2/2014 | Hoffjann et al. |
| 8,672,263 B2 | 3/2014 | Stolte |
| 8,684,304 B2 | 4/2014 | Burns et al. |
| 8,723,349 B2 | 5/2014 | Huang et al. |
| 8,723,385 B2 | 5/2014 | Jia et al. |
| 8,756,910 B2 | 6/2014 | Donovan et al. |
| 8,857,191 B2 | 10/2014 | Hyde et al. |
| 8,890,343 B2 | 11/2014 | Bulin et al. |
| 8,939,399 B2 | 1/2015 | Kouros et al. |
| 8,998,580 B2 | 4/2015 | Quiroz-Hernandez |
| 9,038,398 B2 | 5/2015 | Suciu et al. |
| 2005/0150970 A1 | 7/2005 | Beutin et al. |
| 2007/0215326 A1* | 9/2007 | Schwarz ................ F01D 5/046 165/96 |
| 2010/0038473 A1 | 2/2010 | Schneider et al. |
| 2012/0119020 A1 | 5/2012 | Burns et al. |
| 2012/0153076 A1 | 6/2012 | Burns et al. |
| 2012/0198814 A1 | 8/2012 | Hirshberg |
| 2012/0209456 A1 | 8/2012 | Harmon et al. |
| 2013/0032215 A1 | 2/2013 | Streifinger |
| 2013/0036730 A1 | 2/2013 | Bruno et al. |
| 2013/0052005 A1 | 2/2013 | Cloft |
| 2013/0062885 A1 | 3/2013 | Taneja |
| 2013/0088019 A1 | 4/2013 | Huang et al. |
| 2013/0094963 A1* | 4/2013 | Rolt ...................... B64D 27/02 416/1 |
| 2013/0099065 A1 | 4/2013 | Stuhlberger |
| 2013/0139515 A1 | 6/2013 | Schlak |
| 2013/0154359 A1 | 6/2013 | Huang et al. |
| 2013/0184958 A1 | 7/2013 | Dyrla et al. |
| 2013/0227950 A1 | 9/2013 | Anderson et al. |
| 2013/0251525 A1 | 9/2013 | Saiz |
| 2013/0306024 A1 | 11/2013 | Rolt |
| 2014/0010652 A1 | 1/2014 | Suntharalingam et al. |
| 2014/0060995 A1 | 3/2014 | Anderson et al. |
| 2014/0151495 A1 | 6/2014 | Kuhn, Jr. |
| 2014/0250861 A1 | 9/2014 | Eames |
| 2014/0283519 A1 | 9/2014 | Mariotto et al. |
| 2014/0290208 A1 | 10/2014 | Rechain et al. |
| 2014/0339371 A1 | 11/2014 | Yates et al. |
| 2014/0345281 A1 | 11/2014 | Galbraith |
| 2014/0346283 A1 | 11/2014 | Salyer |
| 2014/0367510 A1* | 12/2014 | Viala ..................... B64D 27/24 244/62 |
| 2014/0367525 A1 | 12/2014 | Salyer |
| 2014/0369810 A1 | 12/2014 | Binks et al. |
| 2015/0013306 A1 | 1/2015 | Shelley |
| 2015/0028594 A1 | 1/2015 | Mariotto |
| 2015/0151844 A1 | 6/2015 | Anton et al. |
| 2015/0380999 A1 | 12/2015 | Joshi et al. |
| 2016/0009402 A1* | 1/2016 | Hunter .................. B64D 27/24 244/53 R |
| 2016/0137305 A1 | 5/2016 | Joubert et al. |
| 2016/0298543 A1* | 10/2016 | Suciu ...................... F01D 25/20 |
| 2017/0081037 A1* | 3/2017 | Marrinan .............. B64D 29/04 |
| 2017/0101191 A1* | 4/2017 | Becker .................. B64D 27/18 |
| 2017/0268409 A1* | 9/2017 | Thomassin ............ B64C 21/08 |
| 2017/0275009 A1* | 9/2017 | Huang ................... B64D 27/10 |
| 2018/0045068 A1* | 2/2018 | Brinson ................. B64D 13/06 |
| 2018/0051716 A1* | 2/2018 | Cheung ............... F04D 29/5806 |
| 2018/0079514 A1* | 3/2018 | Ramakrishnan ....... B64D 27/14 |
| 2018/0118364 A1* | 5/2018 | Golshany .............. B64D 35/08 |
| 2018/0156109 A1* | 6/2018 | Suciu ....................... F02C 6/08 |
| 2018/0170560 A1* | 6/2018 | Conti ..................... B64D 27/14 |
| 2018/0178920 A1* | 6/2018 | Swann ................... B64D 27/24 |
| 2018/0208322 A1* | 7/2018 | Tantot ................... B64D 27/14 |
| 2018/0354637 A1* | 12/2018 | Suciu .................... B64D 33/02 |
| 2018/0370641 A1* | 12/2018 | Dindar .................. B64D 27/10 |
| 2019/0031363 A1* | 1/2019 | Hoisington ........... B64D 35/02 |

FOREIGN PATENT DOCUMENTS

| | | | |
|---|---|---|---|
| EP | 3 048 042 A1 | 7/2016 | |
| EP | 3339166 A1 * | 6/2018 | ........... B64C 1/0009 |

(56) References Cited

FOREIGN PATENT DOCUMENTS

GB            2489311 A     9/2012
WO    WO2010/020199 A1     2/2010
WO    WO2014/072615 A1     5/2014

OTHER PUBLICATIONS

Bradley et al., "Subsonic Ultra Green Aircraft Research, Phase II: N+4 Advanced Concept Development," NASA/CR-2012-217556, May 2012.
Bouferrouk et al., "Innovative Methods for the Passive and Active Control of Flow and Heat Transfer for Gas Turbine Blade Cooling", FET 07, FET_07.docx.
International Search Report and Written Opinion issued in connection with corresponding PCT Application No. PCT/US2017/046193 dated May 24, 2018.

* cited by examiner

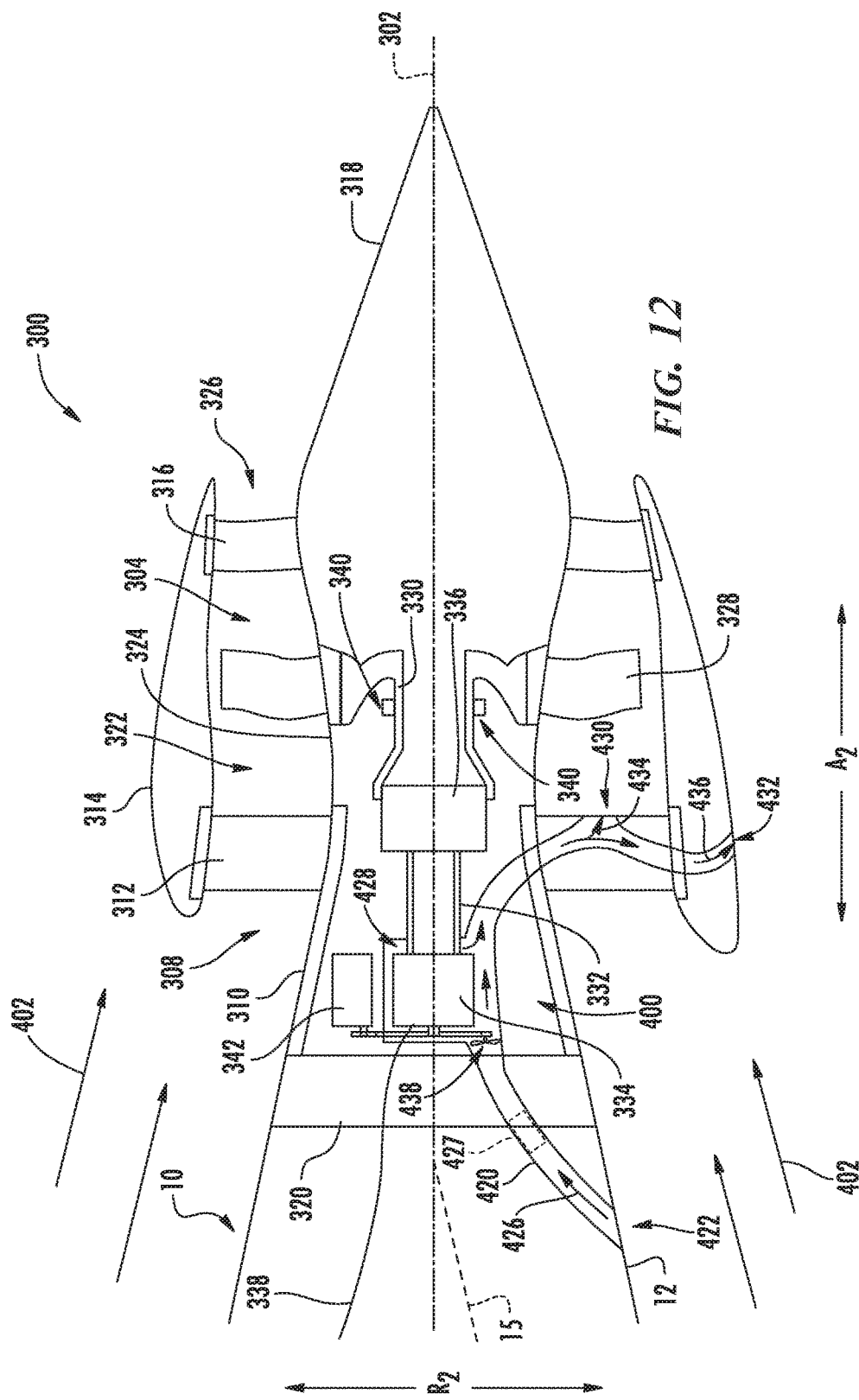

PROPULSION ENGINE FOR AN AIRCRAFT

FIELD OF THE INVENTION

The present subject matter relates generally to an aircraft propulsion system.

BACKGROUND OF THE INVENTION

A conventional commercial aircraft generally includes a fuselage, a pair of wings, and a propulsion system that provides thrust. The propulsion system typically includes at least two aircraft engines, such as turbofan jet engines. Each turbofan jet engine is mounted to a respective one of the wings of the aircraft, such as in a suspended position beneath the wing, separated from the wing and fuselage. Such a configuration allows for the turbofan jet engines to interact with separate, freestream airflows that are not impacted by the wings and/or fuselage. This configuration can reduce an amount of turbulence within the air entering an inlet of each respective turbofan jet engine, which has a positive effect on a net propulsive thrust of the aircraft.

However, a drag on the aircraft including the turbofan jet engines, also has an effect on the net propulsive thrust of the aircraft. A total amount of drag on the aircraft, including skin friction, form, and induced drag, is generally proportional to a difference between a freestream velocity of air approaching the aircraft and an average velocity of a wake downstream from the aircraft that is produced due to the drag on the aircraft.

Systems have been proposed to counter the effects of drag and/or to improve an efficiency of the turbofan jet engines. For example, certain propulsion systems incorporate boundary layer ingestion systems to route a portion of relatively slow moving air forming a boundary layer across, e.g., the fuselage and/or the wings, into the turbofan jet engines upstream from a fan section of the turbofan jet engines. Although this configuration improves propulsion efficiency by reenergizing the boundary layer airflow downstream from the aircraft, the relatively slow moving flow of air from the boundary layer entering the turbofan jet engine generally has a nonuniform or distorted velocity profile. As a result, such turbofan jet engines can experience an efficiency loss minimizing or negating any benefits of improved propulsion efficiency on the aircraft.

Accordingly, a propulsion system including one or more components to improve propulsion efficiency would be useful. More particularly, a propulsion system including one or more components to improve propulsion efficiency without causing any substantial decreases in an efficiency of the aircraft engines would be especially beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a propulsion system is provided for an aircraft having an aft end. The propulsion system includes an electric propulsion engine defining a central axis. The electric propulsion engine includes an electric motor, a fan rotatable about the central axis of the electric propulsion engine by the electric motor, and a bearing supporting rotation of the fan. The electric propulsion engine also includes a thermal management system having a lubrication oil circulation assembly for providing the bearing with lubrication oil, and a heat exchanger thermally connected to the lubrication oil circulation assembly.

In another exemplary embodiment of the present disclosure, a boundary layer ingestion fan defining a central axis is provided. The boundary layer ingestion fan includes an electric motor, a fan rotatable about the central axis of the boundary layer ingestion fan by the electric motor, and a bearing supporting rotation of the fan. The boundary layer ingestion fan also includes a thermal management system having a lubrication oil circulation assembly for providing the bearing with lubrication oil, and a heat exchanger thermally connected to the lubrication oil circulation assembly These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 12 is a close up, schematic, cross-sectional view of an aft engine in accordance with yet another exemplary embodiment of the present disclosure.

DETAILED DESCRIPTION OF THE INVENTION

Figure 1:
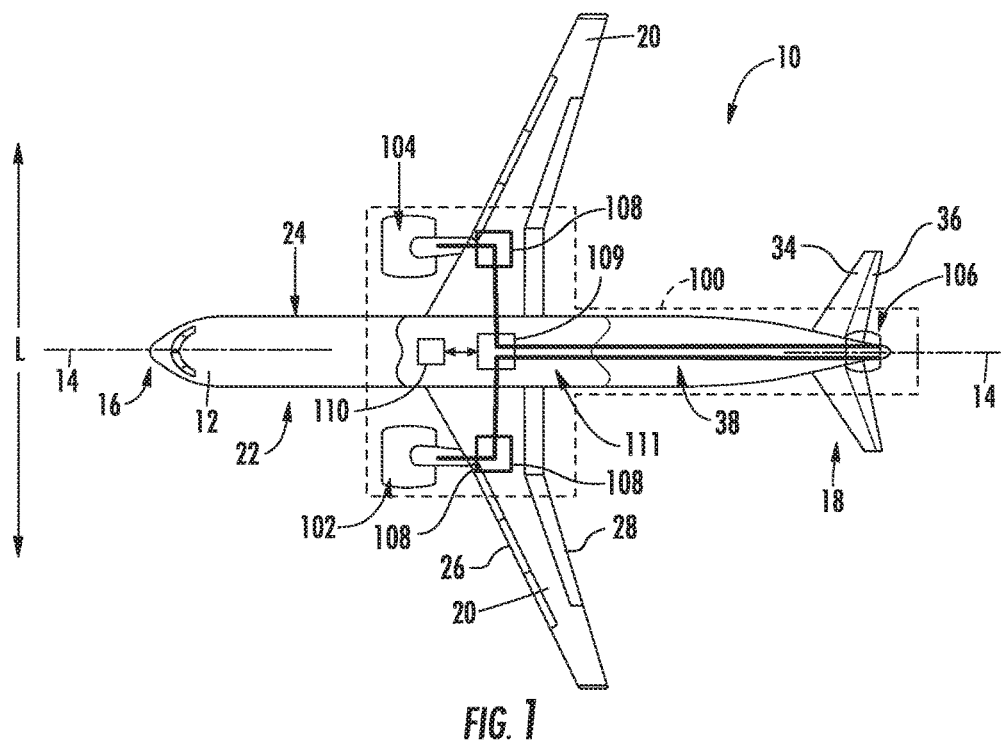
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The terms "forward" and "aft" refer to the relative positions of a component based on an actual or anticipated direction of travel. For example, "forward" may refer to a front of an aircraft based on an anticipated direction of travel of the aircraft, and "aft" may refer to a back of the aircraft based on an anticipated direction of travel of the aircraft.

The present disclosure provides for an electric propulsion engine for an aircraft configured to be mounted, in certain embodiments, at an aft end of the aircraft. The electric propulsion engine includes a fan rotatable by an electric motor and features for supporting rotation of the fan. Specifically, the electric propulsion engine of the present disclosure includes a bearing supporting, e.g., a fan shaft of the fan, and a thermal management system. The thermal management system includes a lubrication oil circulation assembly (for providing the bearing with a lubrication oil) and a heat exchanger thermally connected to lubrication oil circulation assembly. Such a configuration may allow for the bearing to be fully lubricated and maintained within a desired operating temperature range during operation of the electric propulsion engine.

Figure 2:
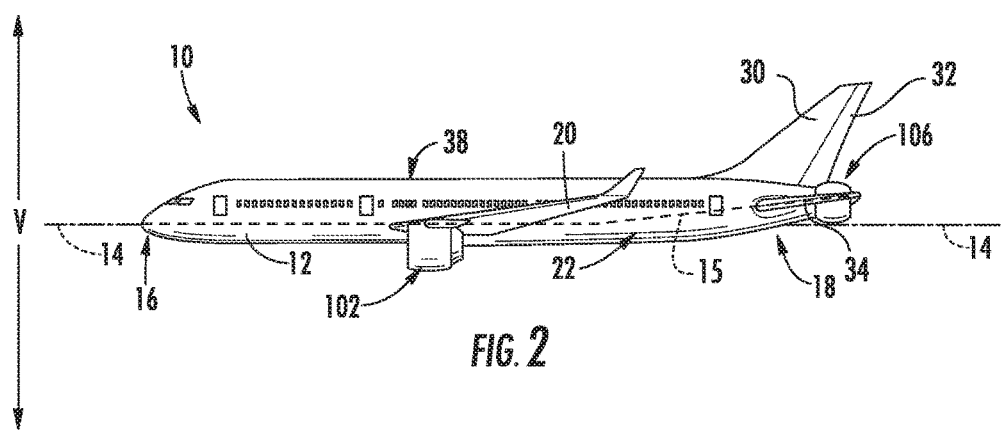
FIG. 2 is a port side view of the exemplary aircraft of FIG. 1

Referring now to the drawings, wherein identical numerals indicate the same elements throughout the figures, FIG. 1 provides a top view of an exemplary aircraft 10 as may incorporate various embodiments of the present invention. FIG. 2 provides a port side view of the aircraft 10 as illustrated in FIG. 1. As shown in FIGS. 1 and 2 collectively, the aircraft 10 defines a longitudinal centerline 14 that extends therethrough, a vertical direction V, a lateral direction L, a forward end 16, and an aft end 18. Moreover, the aircraft 10 defines a mean line 15 extending between the forward end 16 and aft end 18 of the aircraft 10. As used herein, the "mean line" refers to a midpoint line extending along a length of the aircraft 10, not taking into account the appendages of the aircraft 10 (such as the wings 20 and stabilizers discussed below).

Moreover, the aircraft 10 includes a fuselage 12, extending longitudinally from the forward end 16 of the aircraft 10 towards the aft end 18 of the aircraft 10, and a pair of wings 20. As used herein, the term "fuselage" generally includes all of the body of the aircraft 10, such as an empennage of the aircraft 10. The first of such wings 20 extends laterally outwardly with respect to the longitudinal centerline 14 from a port side 22 of the fuselage 12 and the second of such wings 20 extends laterally outwardly with respect to the longitudinal centerline 14 from a starboard side 24 of the fuselage 12. Each of the wings 20 for the exemplary embodiment depicted includes one or more leading edge flaps 26 and one or more trailing edge flaps 28. The aircraft 10 further includes a vertical stabilizer 30 having a rudder flap 32 for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration of stabilizer that may or may not extend directly along the vertical direction V or horizontal/lateral direction L.

The exemplary aircraft 10 of FIGS. 1 and 2 includes a propulsion system 100, herein referred to as "system 100". The exemplary system 100 includes an aircraft engine, or rather a pair of aircraft engines, each configured to be mounted to one of the pair of wings 20, and an electric propulsion engine. More specifically, for the embodiment depicted, the aircraft engines are configured as gas turbine engines, or rather as turbofan jet engines 102, 104 attached to and suspended beneath the wings 20 in an under-wing configuration. Additionally, the electric propulsion engine is configured to be mounted at the aft end of the aircraft 10, and hence the electric propulsion engine depicted may be referred to as an "aft engine." Further, the electric propulsion engine depicted is configured to ingest and consume air forming a boundary layer over the fuselage 12 of the aircraft 10. Accordingly, the exemplary aft engine depicted may be referred to as a boundary layer ingestion (BLI) fan 106. The BLI fan 106 is mounted to the aircraft 10 at a location aft of the wings 20 and/or the jet engines 102, 104. Specifically, for the embodiment depicted, the BLI fan 106 is fixedly connected to the fuselage 12 at the aft end 18, such that the BLI fan 106 is incorporated into or blended with a tail section at the aft end 18, and such that the mean line 15 extends therethrough.

Referring still to the embodiment of FIGS. 1 and 2, in certain embodiments the propulsion system further includes one or more electric generators 108 operable with the jet engines 102, 104. For example, one or both of the jet engines 102, 104 may be configured to provide mechanical power from a rotating shaft (such as an LP shaft or HP shaft) to the electric generators 108. Additionally, the electric generators 108 may be configured to convert the mechanical power to electrical power. For the embodiment depicted, the propulsion system 100 includes an electric generator 108 for each jet engine 102, 104. As will be discussed below, in certain exemplary aspects, the electric generator 108 for each jet engine 102, 104 may be configured as part of an accessory gearbox for the jet engine 102, 104. Alternatively, however, in other embodiments, the electric generator 108 may be separate from an accessory gearbox for the jet engines 102 104, and located at any suitable position within the jet engines 102, 104 or aircraft 10.

Furthermore, the propulsion system 100 includes a power conditioner 109 and an energy storage device 110. The electric generators 108 may send electrical power to the power conditioner 109, which may transform the electrical energy to a proper form and either store the energy in the energy storage device 110 or send the electrical energy to the BLI fan 106. For the embodiment depicted, the electric generators 108, power conditioner 109, energy storage device 110, and BLI fan 106 are all are connected to an electric communication bus 111, such that the electric generators 108 may be in electrical communication with the BLI fan 106 and/or the energy storage device 110, and such that the electric generators 108 may provide electrical power to one or both of the energy storage device 110 or the BLI fan 106. Accordingly, in such an embodiment, the propulsion system 100 may be referred to as a gas-electric propulsion system.

It should be appreciated, however, that the aircraft 10 and propulsion system 100 depicted in FIGS. 1 and 2 is provided by way of example only and that in other exemplary embodiments of the present disclosure, any other suitable aircraft 10 may be provided having a propulsion system 100 configured in any other suitable manner. For example, it should be appreciated that in various other embodiments, the BLI fan 106 may alternatively be positioned at any suitable location proximate the aft end 18. Further, in still other embodiments the electric propulsion engine may not be positioned at the aft end of the aircraft 10, and thus may not be configured as an "aft engine." For example, in other embodiments, the electric propulsion engine may be incorporated into the fuselage of the aircraft 10, and thus configured as a "podded engine." Alternatively, in still other embodiments, the electric propulsion engine may be incorporated into a wing of the aircraft 10, and thus may be configured as a "blended wing engine." Further, in other embodiments, the propulsion system 100 may not include, e.g., the power conditioner 109 and/or the energy storage device 110, and instead the generator(s) 108 may be directly connected to the BLI fan 106.

Figure 3:
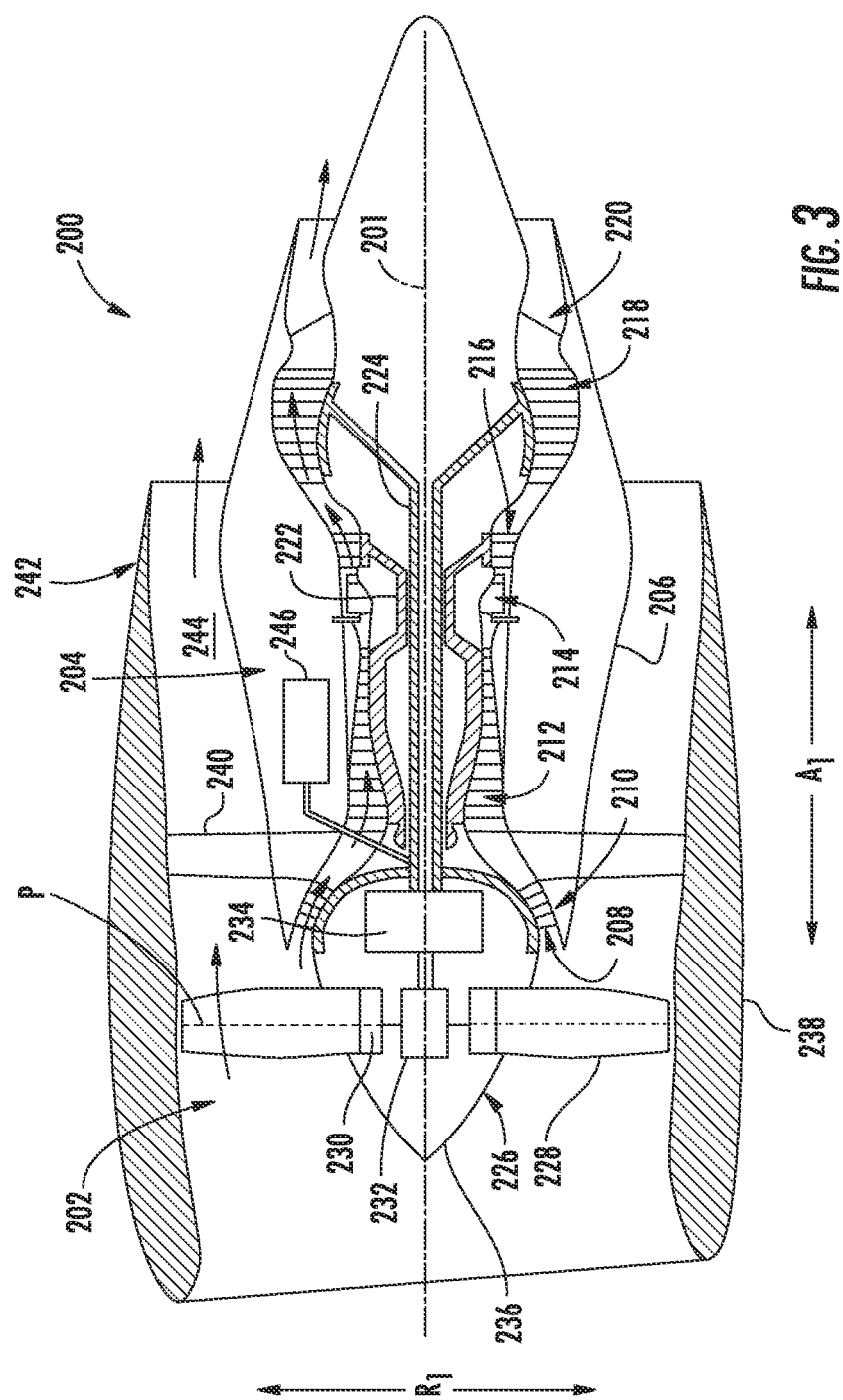
FIG. 3 is a schematic, cross-sectional view of a gas turbine engine mounted to the exemplary aircraft of FIG. 1.

Referring now to FIG. 3, in at least certain embodiments, the jet engines 102, 104 may be configured as high-bypass turbofan jet engines. FIG. 3 is a schematic cross-sectional view of an exemplary high-bypass turbofan jet engine 200, herein referred to as "turbofan 200." In various embodiments, the turbofan 200 may be representative of jet engines 102, 104. As shown in FIG. 3, the turbofan 200 defines an axial direction A1 (extending parallel to a longitudinal centerline 201 provided for reference) and a radial direction R1. In general, the turbofan 200 includes a fan section 202 and a core turbine engine 204 disposed downstream from the fan section 202.

The exemplary core turbine engine 204 depicted generally includes a substantially tubular outer casing 206 that defines an annular inlet 208. The outer casing 206 encases, in serial flow relationship, a compressor section including a booster or low pressure (LP) compressor 210 and a high pressure (HP) compressor 212; a combustion section 214; a turbine section including a high pressure (HP) turbine 216 and a low pressure (LP) turbine 218; and a jet exhaust nozzle section 220. A high pressure (HP) shaft or spool 222 drivingly connects the HP turbine 216 to the HP compressor 212. A low pressure (LP) shaft or spool 224 drivingly connects the LP turbine 218 to the LP compressor 210.

For the embodiment depicted, the fan section 202 includes a variable pitch fan 226 having a plurality of fan blades 228 coupled to a disk 230 in a spaced apart manner. As depicted, the fan blades 228 extend outwardly from disk 230 generally along the radial direction R1. Each fan blade 228 is rotatable relative to the disk 230 about a pitch axis P by virtue of the fan blades 228 being operatively coupled to a suitable actuation member 232 configured to collectively vary the pitch of the fan blades 228 in unison. The fan blades 228, disk 230, and actuation member 232 are together rotatable about the longitudinal axis 12 by LP shaft 224 across a power gear box 234. The power gear box 234 includes a plurality of gears for stepping down the rotational speed of the LP shaft 224 to a more efficient rotational fan speed.

Referring still to the exemplary embodiment of FIG. 3, the disk 230 is covered by rotatable front hub 236 aerodynamically contoured to promote an airflow through the plurality of fan blades 228. Additionally, the exemplary fan section 202 includes an annular fan casing or outer nacelle 238 that circumferentially surrounds the fan 226 and/or at least a portion of the core turbine engine 204. It should be appreciated that the nacelle 238 may be configured to be supported relative to the core turbine engine 204 by a plurality of circumferentially-spaced outlet guide vanes 240. Moreover, a downstream section 242 of the nacelle 238 may extend over an outer portion of the core turbine engine 204 so as to define a bypass airflow passage 244 therebetween.

Further, the turbofan engine 200 depicted in FIG. 3 includes an accessory gearbox 246 dedicated to the exemplary turbofan engine 200. As is depicted schematically, the accessory gearbox 246 is mechanically coupled to a rotary component of the turbofan engine 200, or more particularly for the embodiment depicted, the accessory gearbox 246 is mechanically coupled to the LP shaft 224 of the turbofan engine 200. Accordingly, for the embodiment depicted, the accessory gearbox 246 is driven by the LP shaft 224. Also for the embodiment depicted, the accessory gearbox 246 includes an electrical machine (not shown), which may be configured as an electric motor and/or an electric generator. When the turbofan engine 200 is incorporated in the propulsion system 100 described above with reference to FIGS. 1 and 2, the electrical machine may thus include the electric generator 108. Such a configuration may allow for the accessory gearbox 246, including the electrical machine, to generate electrical power from a rotation of the LP shaft 224.

It should be appreciated, however, that the exemplary turbofan engine 200 depicted in FIG. 3 is by way of example only, and that in other exemplary embodiments, the turbofan engine 200 may have any other suitable configuration. Further, it should be appreciated, that in other exemplary embodiments, the jet engines 102, 104 may instead be configured as any other suitable aeronautical engine, such as a turboprop engine, turbojet engine, internal combustion engine, etc.

Figure 4:
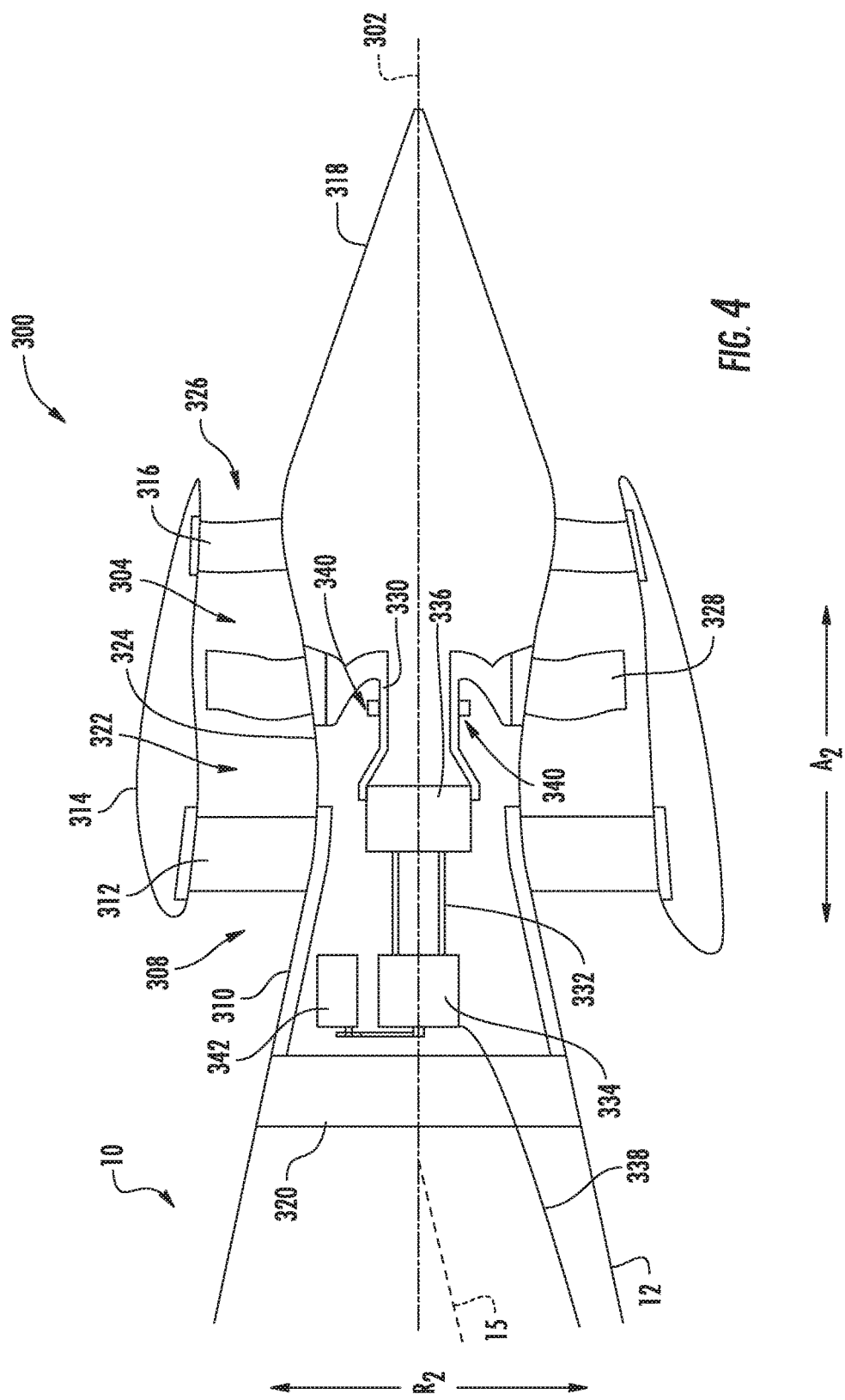
FIG. 4 is a schematic, cross-sectional view of an aft engine in accordance with an exemplary embodiment of the present disclosure.

Referring now to FIG. 4, a schematic, cross-sectional side view of an electric propulsion engine in accordance with various embodiments of the present disclosure is provided. The electric propulsion engine depicted is mounted to an aircraft 10 at an aft end 18 of the aircraft 10 and is configured to ingest a boundary layer air. Accordingly, for the embodiment depicted, the electric propulsion engine is configured as a boundary layer ingestion (BLI), aft fan (referred to hereinafter as "BLI fan 300"). The BLI fan 300 may be configured in substantially the same manner as the BLI fan 106 described above with reference to FIGS. 1 and 2 and the aircraft 10 may be configured in substantially the same manner as the exemplary aircraft 10 described above with reference to FIGS. 1 and 2. In other embodiments of the present disclosure, however, the electric propulsion engine may instead be positioned at any other suitable location on the aircraft 10, and may additionally or alternatively be configured to ingest freestream air.

As shown in FIG. 4, the BLI fan 300 defines an axial direction A2 extending along a longitudinal centerline axis 302 that extends therethrough for reference, as well as a radial direction R2 and a circumferential direction C2 (a direction extending about the axial direction A2, not shown). Additionally, the aircraft 10 defines a mean line 15 extending therethrough.

In general, the BLI fan 300 includes a fan 304 rotatable about the centerline axis 302 and a fan frame 308. The fan frame 308 is configured for mounting the BLI fan 300 to the aircraft 10, and for the embodiment depicted generally includes an inner frame support 310, a plurality of forward support members 312, an outer nacelle 314, a plurality of aft support members 316, and a tail cone 318. As is depicted, the inner frame support 310 is attached to a bulkhead 320 of the fuselage 12. The plurality of forward support members 312 are attached to the inner frame support 310 and extend outward generally along the radial direction R2 to the nacelle 314. The nacelle 314 defines an airflow passage 322 with an inner casing 324 of the BLI fan 300, and at least partially surrounds the fan 304. Further, for the embodiment depicted, the nacelle 314 extends substantially three hundred and sixty degrees (360°) around the mean line 15 of the aircraft 10. The plurality of aft support members 316 also extend generally along the radial direction R2 from, and structurally connect, the nacelle 314 to the tail cone 318.

In certain embodiments, the forward support members 312 and the aft support members 316 may each be generally spaced along the circumferential direction C2 of the BLI fan 300. Additionally, in certain embodiments the forward support members 312 may be generally configured as inlet guide vanes and the aft support members 316 may generally be configured as outlet guide vanes. If configured in such a manner, the forward and aft support members 312, 316 may direct and/or condition an airflow through the airflow passage 322 of the BLI fan 300. Notably, one or both of the forward support members 312 or aft support members 316 may additionally be configured as variable guide vanes. For example, the support member may include a flap (not shown) positioned at an aft end of the support member for directing a flow of air across the support member.

It should be appreciated, however, that in other exemplary embodiments, the fan frame 308 may instead include any other suitable configuration and, e.g., may not include each of the components depicted and described above. Alternatively, the fan frame 308 may include any other suitable components not depicted or described above.

The BLI fan 300 additionally defines a nozzle 326 between the nacelle 314 and the tail cone 318. The nozzle 326 may be configured to generate an amount of thrust from the air flowing therethrough, and the tail cone 318 may be shaped to minimize an amount of drag on the BLI fan 300. However, in other embodiments, the tail cone 318 may have any other shape and may, e.g., end forward of an aft end of the nacelle 314 such that the tail cone 318 is enclosed by the nacelle 314 at an aft end. Additionally, in other embodiments, the BLI fan 300 may not be configured to generate any measureable amount of thrust, and instead may be configured to ingest air from a boundary layer of air of the fuselage 12 of the aircraft 10 and add energy/speed up such air to reduce an overall drag on the aircraft 10 (and thus increase a net thrust of the aircraft 10).

Referring still to FIG. 4, the fan 304 includes a plurality of fan blades 328 and a fan shaft 330. The plurality of fan blades 328 are attached to the fan shaft 330 and spaced generally along the circumferential direction C2 of the BLI fan 300. As depicted, the plurality fan blades 328 are, for the embodiment depicted, at least partially enclosed by the nacelle 314.

In certain exemplary embodiments, the plurality of fan blades 328 may be attached in a fixed manner to the fan shaft 330, or alternatively, the plurality of fan blades 328 may be rotatably attached to the fan shaft 330. For example, the plurality of fan blades 328 may be attached to the fan shaft 330 such that a pitch of each of the plurality of fan blades 328 may be changed, e.g., in unison, by a pitch change mechanism (not shown). Changing the pitch of the plurality of fan blades 328 may increase an efficiency of the BLI fan 300 and/or may allow the BLI fan 300 to achieve a desired thrust profile. With such an exemplary embodiment, the BLI fan 300 may be referred to as a variable pitch BLI fan.

Moreover, for the embodiment depicted, the fan 304 is rotatable about the centerline axis 302 of the BLI fan 300 by an electric motor 334. More particularly, for the embodiment depicted, the BLI fan 300 additionally includes a power gearbox 336 mechanically coupled to the electric motor 334, with the fan 304 mechanically coupled to the power gearbox 336. For example, for the embodiment depicted, the fan shaft 330 extends to and is coupled to the power gearbox 336, and a driveshaft 332 of the electric motor 334 extends to and is also coupled to the power gearbox 336. Accordingly, for the embodiment depicted, the fan 304 is rotatable about the central axis 302 of the BLI fan 300 by the electric motor 334 through the power gearbox 336.

The power gearbox 336 may include any type of gearing system for altering a rotational speed between the driveshaft 332 and the fan shaft 330. For example, the power gearbox 336 may be configured as a star gear train, a planetary gear train, or any other suitable gear train configuration. Additionally, the power gearbox 336 may define a gear ratio, which as used herein, refers to a ratio of a rotational speed of the driveshaft 332 to a rotational speed of the fan shaft 330.

Referring still to the exemplary embodiment of FIG. 4, the electric motor 334 is located forward of the power gearbox 336, and the power gearbox 336 is, in turn, located forward of the fan 304. Notably, the electric motor 334 is in electrical communication with a power source via an electrical line 338. In certain exemplary embodiments, the BLI fan 300 may be configured with a gas-electric propulsion system, such as the gas-electric propulsion system 100 described above with reference to FIGS. 1 and 2. In such an embodiment, the electric line 338 may be configured as part of the electrical communication bus 111, such that the electric motor 334 may receive power from one or both of an energy storage device or an electric generator—such as the energy storage device 110 or electric generators 108 of FIGS. 1 and 2, and/or from the electrical machine of the accessory gearbox 246 of the turbofan engine 200.

Furthermore, as is depicted schematically in FIG. 4, the BLI fan 300 additionally includes a bearing 340 supporting rotation of the fan 304. More particularly, the exemplary BLI fan 300 of FIG. 4 includes a bearing 340 directly supporting the fan shaft 330 of the fan 304. Although not depicted, the bearing 340 may be supported by one or more structural members of the BLI fan 300. Additionally, as will be discussed in greater detail below, the BLI fan 300 includes an accessory gearbox 342 dedicated to the BLI fan 300 and a thermal management system. The thermal management system may be configured at least partially with (e.g., included at least partially within) the accessory gearbox 342 and may be configured for providing lubrication oil to (and from) the bearing 340, and further for managing a temperature of such lubrication oil and bearing 340.

Figure 5:
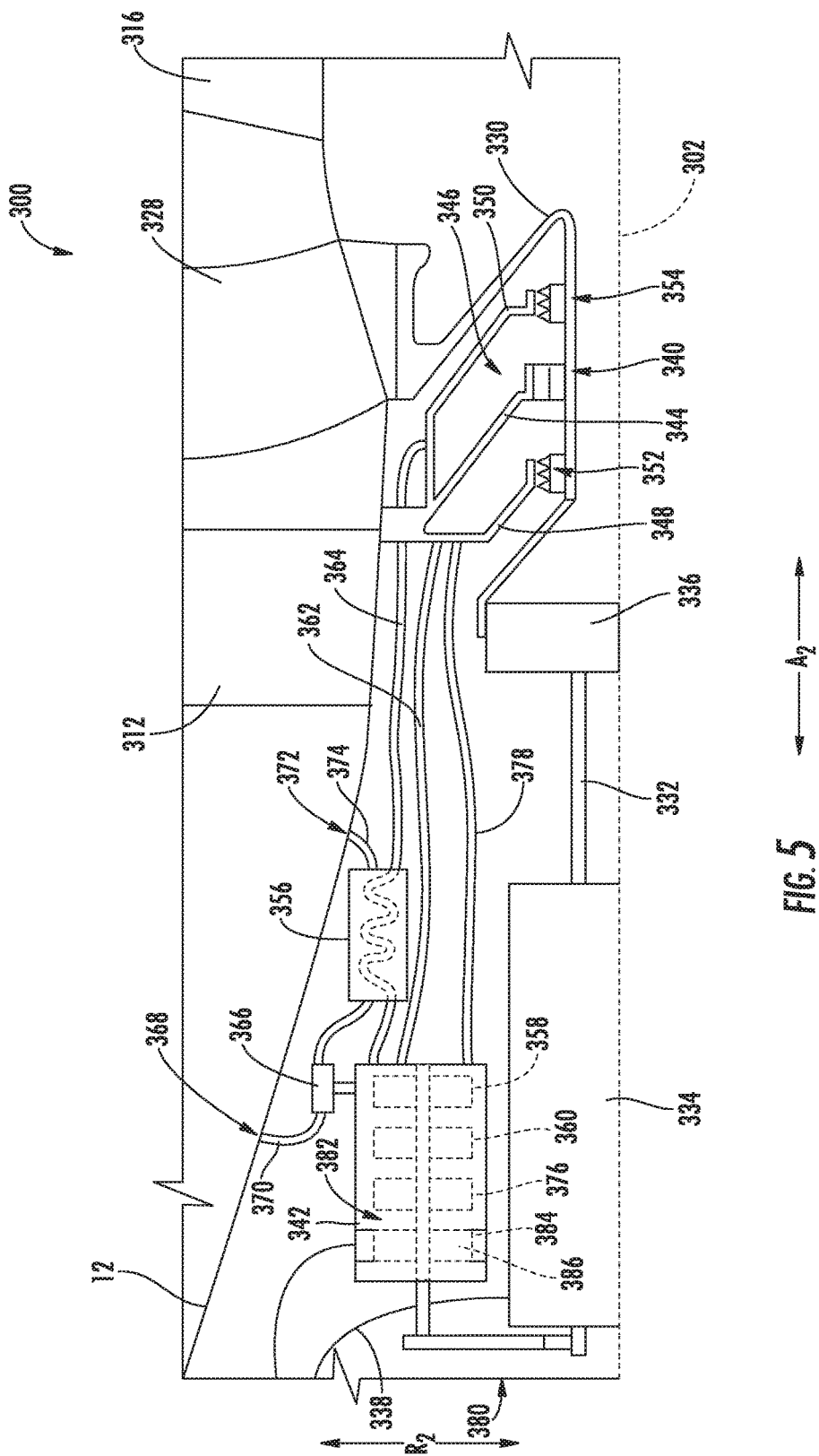
FIG. 5 is a close up, schematic, cross-sectional view of the exemplary aft engine of FIG. 4.

Referring now to FIG. 5, providing a close-up, schematic, cross-sectional view of the exemplary BLI fan 300 of FIG. 4, the thermal management system and other aspects of the BLI fan 300 are depicted. For the exemplary embodiment depicted, the bearing 340 is configured as a single, roller element bearing directly supporting the fan shaft 330. However, in other embodiments, the bearing 340 may include any other suitable type of oil-lubricated bearing, such as a ball bearing, tapered roller bearing, etc. Additionally, in still other embodiments, the bearing 340 may additionally or alternatively include an air bearing, and further may include a plurality of bearings supporting rotation of the fan 304, and more particularly, the fan shaft 330.

The bearing 340 is supported by a static structural member 344 of the BLI fan 300, and is enclosed within a sump 346 of the BLI fan 300. The sump 346, as will be discussed in greater detail below, is configured to collect lubrication oil provided to the bearing 340. The lubrication oil is provided to the bearing 340 for, e.g., lubricating the bearing 340 and regulating a temperature of the bearing 340. The exemplary sump 346 depicted includes a forward sump wall 348 and an aft sump wall 350. Additionally, the fan shaft 330 includes a forward seal 352 configured to form a seal with the forward sump wall 348 and an aft seal 354 configured to form a seal with the aft sump wall 350. It should be appreciated, however, that in other embodiments, the sump 346 enclosing the bearing 340 have any other suitable configuration capable of collecting lubrication oil provided to the bearing 340.

As mentioned above, the exemplary BLI fan 300 depicted includes a thermal management system. Specifically, the exemplary thermal management system includes a lubrication oil circulation assembly and a heat exchanger 356 thermally connected to the lubrication oil circulation assembly. The lubrication oil circulation assembly is configured for providing the bearing 340 with the lubrication oil, and in certain embodiments, includes a lubrication oil supply pump 358 and a lubrication oil scavenge pump 360. Notably, for the exemplary embodiment depicted, the lubrication oil supply pump 358 and lubrication oil scavenge pump 360 are included within and driven by the accessory gearbox 342. However, in other embodiments, the lubrication oil supply pump 358 and lubrication oil scavenge pump 360 may instead be separate from the accessory gearbox 342 and, e.g., mechanically coupled to the accessory gearbox 342 in a suitable manner. Moreover, although not depicted, the lubrication oil circulation assembly may additionally include, e.g., a lubrication oil tank and/or other features not depicted or described herein.

The lubrication oil supply pump 358 is fluidly connected to a lubrication oil supply line 362 for providing lubrication oil to the bearing 340 within the sump 346. Similarly, the lubrication oil scavenge pump 360 is fluidly connected to a lubrication oil scavenge line 364 for scavenging out lubrication oil from within the sump 346. The heat exchanger 356 is positioned in the flowpath of the lubrication oil scavenge line 364 for cooling the lubrication oil flowing therethrough. Particularly for the embodiment depicted, the heat exchanger 356 is located between two segments of the lubrication oil scavenge line 364 and is configured as an air cooled oil cooler. Accordingly, an airflow through the air cooled oil cooler may accept heat from the scavenged lubrication oil flowing through the lubrication oil scavenge line 364 and heat exchanger 356. Additionally for the embodiment depicted, the BLI fan 300 includes a blower 366, driven by the accessory gearbox 342, providing an airflow through the air cooled oil cooler. The blower 366 is in airflow communication with an inlet 368 defined by an exterior surface 38 of the fuselage 12 via an inlet line 370. After flowing through the heat exchanger 356, the heated air is exhausted to an exterior location through an outlet 372 defined by the outer surface 38 of the fuselage 12 via an outlet line 374.

It should be appreciated, however, that in other exemplary embodiments the airflow through the heat exchanger 356 may be ducted in any other suitable manner and further that the heat exchanger 356 may be positioned at any other suitable location and/or integrated into one or more additional components of the BLI fan 300. For example, referring now briefly to FIG. 6, a close-up, side, schematic view of a BLI fan 300 in accordance with another exemplary embodiment of the present disclosure is depicted. The exemplary BLI fan 300 depicted in FIG. 6 may be configured in substantially the same manner as exemplary BLI fan 300 depicted in FIG. 5, and accordingly, the same or similar numbers may refer to the same or similar parts. However, for the embodiment of FIG. 6, the heat exchanger 356 is in airflow communication with a cool air source at a location downstream of the fan 304 (e.g., at a location proximate the nozzle 326) through an inlet line 371. For the embodiment depicted, the inlet line 371 extends through the forward support member 312 and along the outer nacelle 314 to the location downstream of the fan 304. The airflow is pulled through the heat exchanger 356 via the pump 366 and through an outlet line 373 to an outlet 375 at a location upstream of the fan 304. Such a configuration may provide air with higher energy into the air flowpath of the fan 304. Notably, however, in further exemplary embodiments, the airflow through the outlet line 373 may instead be ducted to an overboard location that is not located upstream of the fan 304.

Figure 6:
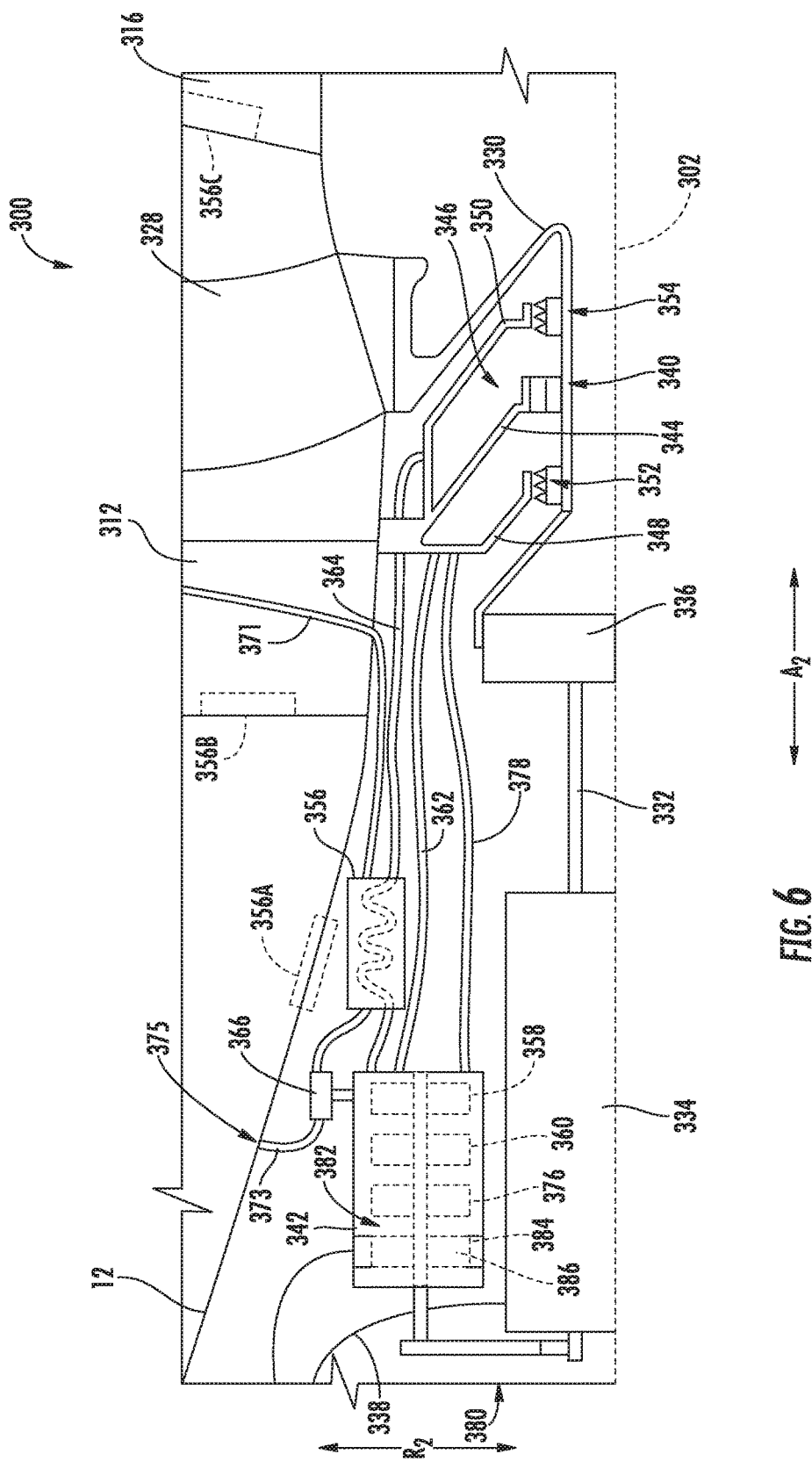
FIG. 6 is a close up, schematic, cross-sectional view of an aft engine in accordance with another exemplary embodiment of the present disclosure.

Further, as is also depicted schematically in FIG. 6, the heat exchanger 356 may be positioned at any other suitable location and/or integrated into one or more additional components of the BLI fan 300. For example, in certain embodiments, the thermal management system may include a heat exchanger 356A integrated into the outer surface 38 of the fuselage 12, a heat exchanger 356B integrated into the forward support member 312/inlet guide vane, a heat exchanger 356C integrated into aft support member 216/outlet guide vane, etc. Moreover, although not depicted, it should be appreciated that in still other embodiments the heat exchanger 356 may instead be positioned in, e.g., the flowpath of the lubrication oil supply line 362 or at any other suitable location.

Referring again to the embodiment of FIG. 5, the BLI fan 300 additionally includes a pressurization pump 376 for maintaining an interior cavity of the sump 346 (or alternatively a cavity surrounding the sump 346) at a desired pressure. Maintaining the interior cavity of the sump 346 at a desired pressure may assist in preventing an amount of lubrication oil from leaking therefrom. For example, the pressurization pump 376 may be a ventilation pump configured to pump air out of the sump 346 to maintain a higher pressure surrounding the sump 346 than within the sump 346. As is depicted schematically, the accessory gearbox 342 additionally drives the pressurization pump 376. Notably, for the embodiment depicted, the pressurization pump 376 is in airflow communication with a sump 346 pressurization line 378 extending to, and in airflow communication with, the sump 346.

Furthermore, the exemplary accessory gearbox 342 is powered by the electric motor 334 of the BLI fan 300. More particularly, for the embodiment depicted, the accessory gearbox 342 is mechanically coupled to and driven by the electric motor 334 through a geartrain 380. Additionally, as previously discussed, the exemplary electric motor 334 depicted is in electrical communication with a power source through the electrical line 338.

The accessory gearbox 342 depicted in FIG. 5 is dedicated to the BLI fan 300. Additionally, the accessory gearbox 342 includes a secondary electrical machine 382. The secondary electrical machine 382 may be, in certain embodiments, an electric generator including a stator 384 and a rotor 386. The accessory gearbox 342 may be configured to rotate the rotor 386 of the secondary electrical machine 382, such that the secondary electrical machine 382 may generate an amount of electrical power. The electrical power generated by the secondary electrical machine 382 may be provided to, e.g., the aircraft 10 for powering certain low power level systems of the aircraft 10 (e.g., avionics, emergency hydraulics/control surfaces, etc.). For example, in a failure scenario, the BLI fan 300 may be utilized essentially as a ram air turbine to provide auxiliary power to the aircraft 10 using the secondary electrical machine 382 of the accessory gearbox 342. Such a configuration may be more advantageous than using power directly from a generator producing relatively high voltage electric power for powering, e.g., the electric motor 334 (and including a variety of power electronics for stepping down such high voltage electric power).

Figure 7:
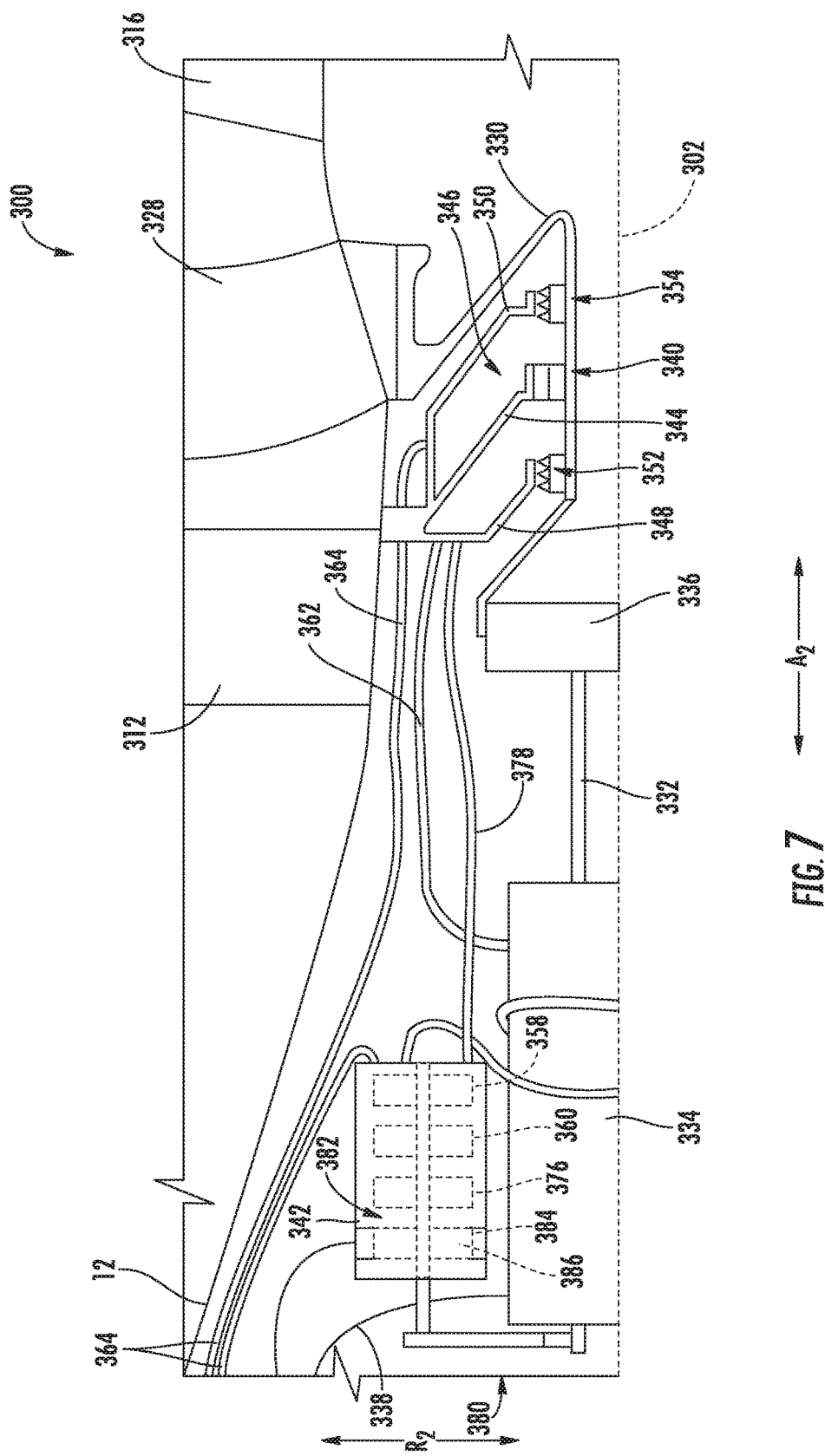
FIG. 7 is a close up, schematic, cross-sectional view of an aft engine in accordance with yet another exemplary embodiment of the present disclosure.

Furthermore, it should be appreciated that in still other exemplary embodiments, the thermal management system of the exemplary BLI fan 300 may share certain components or functions with, e.g., one or more of the gas turbine engines of an aircraft 10 with which the BLI fan 300 is installed. For example, referring now to FIGS. 7 and 8, a propulsion system 100 including a BLI fan 300 in accordance with another exemplary embodiment of the present disclosure is depicted. FIG. 7 provides a close-up, side, schematic view of the exemplary BLI fan 300, and FIG. 8 provides a schematic view of the exemplary propulsion system 100.

Referring first to FIG. 7, the exemplary BLI fan 300 may be configured in substantially the same manner as exemplary BLI fan 300 depicted in FIG. 5, and accordingly, the same numbers may refer to the same or similar parts. Additionally, however, the exemplary BLI fan 300 of FIG. 7 includes a thermal management system having a thermal fluid circulation assembly in thermal communication with at least one of an electric motor 334 of the BLI fan 300 or a bearing 340/bearing sump 346 of the BLI fan 300. Particularly, for the embodiment depicted, the thermal fluid circulation assembly is a lubrication oil circulation assembly in thermal communication with both the electric motor 334 and the bearing 340/bearing sump 346 of the BLI fan 300. Specifically, the exemplary lubrication oil circulation assembly is configured for providing a lubrication oil to, and scavenging lubrication oil from, the bearing 340 and the sump 346. Additionally, for the embodiment depicted, a supply line 362 of the thermal management system is further configured in thermal communication with the electric motor 334 of the BLI fan 300 for removing heat from the electric motor 334.

As with the exemplary lubrication oil circulation assembly of the thermal management system described above with reference to FIG. 5, the exemplary lubrication oil circulation assembly includes a lubrication oil supply pump 358 and a lubrication oil scavenge pump 360. The lubrication oil supply and scavenge pumps 358, 360 are positioned within and driven by an accessory gearbox 342. Notably, however, in other embodiments, the circulation assembly may have any other suitable configuration.

Figure 8:
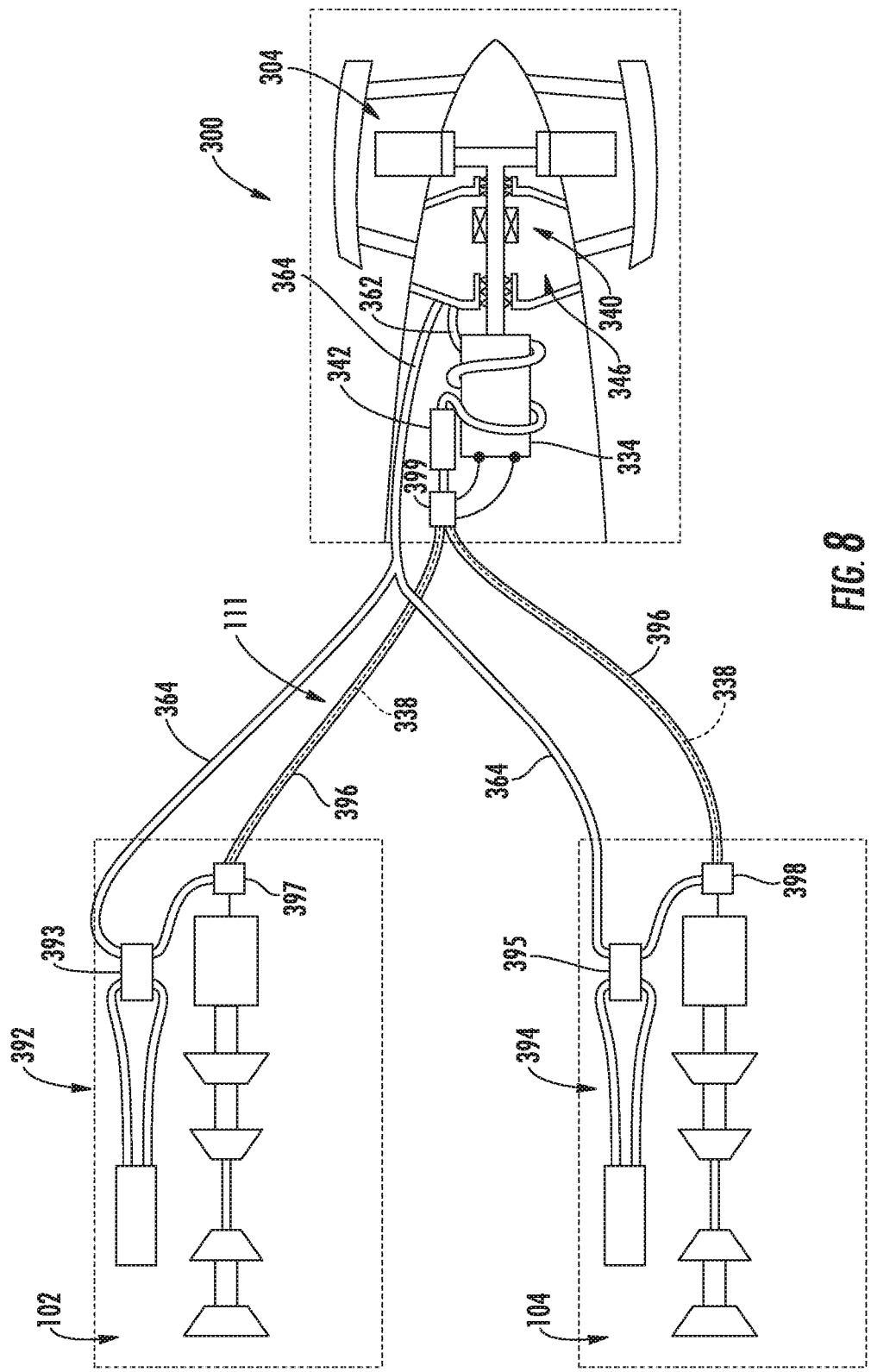
FIG. 8 is a schematic view of a propulsion system in accordance with an exemplary embodiment of the present disclosure including the exemplary aft engine of FIG. 7.

Further, for the embodiment of FIGS. 7 and 8, the thermal management system shares cooling functions with a main aircraft engine, such as an under-wing mounted aircraft engine. More specifically, referring now particularly to FIG. 8, the scavenge line 364 for the embodiment depicted is routed forward, away from the BLI fan 300. Additionally, for the exemplary propulsion system 100 depicted, the propulsion system 100 includes a first engine, such as first engine 102, and a second engine, such as second engine 104. The first engine 102 includes a first thermal management system 392 having a first heat exchanger 393, and the second engine 104 includes a second thermal management system 394 having a second heat exchanger 395, via a parallel flow configuration. As is depicted, the lubrication oil circulation assembly of the exemplary thermal management system of the BLI fan 300 is in thermal communication with at least one of the first heat exchanger 393 of the first thermal management system 392 of the first engine 102, or the second heat exchanger 395 of the second thermal management system 394 of the second engine 104. More specifically, for the embodiment depicted, the scavenge line 364 of lubrication oil circulation assembly of the BLI fan 300 is in thermal communication with both the first heat exchanger 393 and the second heat exchanger 395. In certain exemplary embodiments the first heat exchanger 393 may be an intermediate heat exchanger for positioning the thermal management system of the BLI fan 300 in thermal communication with the thermal management system 392 of the first engine 102, and similarly, the second heat exchanger 395 may be an intermediate heat exchanger for positioning the thermal management system of the BLI fan 300 in thermal communication with the thermal management system 394 of the second engine 104. Accordingly, with such an exemplary embodiment, a leak in the thermal management system of the BLI fan 300 would not necessitate a shutting down of one or both of the first thermal management system 392 or the second thermal management system 394.

It should be appreciated, however, that in other exemplary embodiments, one or both of the first heat exchanger 393 or second heat exchanger 395 may be a heat exchanger utilized for reducing a temperature of both the thermal fluid/lubrication oil through the scavenge line 364 and a thermal fluid/lubrication oil through the first thermal management system 392 or second thermal management system 394. For example, in certain exemplary embodiments, the one or both of the first heat exchanger 393 or second heat exchanger 395 may be configured as a fuel-oil heat exchanger, a bypass air heat exchanger, or any other suitable heat exchanger.

After having been cooled by the first and second heat exchangers 393, 395 of the first and second thermal management systems 392, 394, respectively, the lubrication oil is pumped back through respective return portions 396 of the scavenge line 364 towards the BLI fan 300.

As is depicted, the exemplary propulsion system 100 of FIG. 8 is a hybrid-electric propulsion system 100, similar to the hybrid-electric propulsion system 100 described above with reference to FIGS. 1 and 2. Accordingly, the exemplary propulsion system 100 generally includes a first electric generator 108A coupled to and driven by the first engine 102 and a second electric generator 108B coupled to and driven by the second engine 104. For the exemplary propulsion system 100 depicted, the first and second electric generators 108A, 108B are electrically connected to the electric motor 334 of the BLI fan 300 via an electric communication bus 111. Notably, although for the embodiment depicted the electric motor 334 is depicted as a single motor electrically connected to both the first and second electric generators 108A, 108B, in other embodiments, the electric motor 334 may instead include a plurality of coaxially mounted electric motors. For example, in certain embodiments, the electric motor 334 may include a first electric motor electrically connected to the first electric generator 108A through the electric communication bus 111 and a second, coaxially mounted electric motor electrically connected to the second electric generator 108B also through the electric communication bus 111.

Depending on the electrical demands for the BLI fan 300, it may be necessary to transmit relatively high levels of electric power through the electric communication bus 111. As will be appreciated, transmitting such relatively high levels of electric power may generate an undesirable amount of heat in the electric communication bus, and more particularly, in the transmission lines 338 of the electric communication bus 111. Accordingly, for the embodiment depicted, the electric communication bus includes a first, upstream juncture box 397 proximate the first electric generator 108A and a second upstream juncture box 398 proximate the second electric generator 108B. The first upstream juncture box 397 is electrically connected to the first electric generator 108A and fluidly connected to the return portion 396 of the lubrication oil scavenge line 364, downstream of the first heat exchanger 393. Similarly, the second upstream juncture box 398 is electrically connected to the second electric generator 108B and fluidly connected to the return portion 396 of the lubrication oil scavenge line 364, downstream of the second heat exchanger 395. Moreover, the electric communication bus 111 includes a downstream juncture box 399 positioned proximate the electric motor 334. The downstream juncture box 399 electrically connects to the electric motor 334 and fluidly connects to the lubrication oil circulation assembly, or more particularly, the lubrication oil scavenge pump 360.

Further, as is depicted schematically, the return portions 396 of the scavenge line 364—extending between the first upstream juncture box 397 and the downstream juncture box 399 and between the second upstream juncture box 398 and the downstream juncture box 399—are configured to cool the transmission lines 338 of the electric communication bus 111 extending between the electric generators 108A, 108B and the electric motor 334. Specifically, the transmission lines 338 may extend coaxially within the return portions 396 of the lubrication oil scavenge line 364, surrounded by a cooled lubrication oil flowing therethrough to provide thermal control of the transmission lines 338. Such a configuration may allow for more efficient electrical communication between the electric generators 108A, 108B and the electric motor 334.

It should be appreciated that although for the embodiment depicted the thermal management system of the BLI fan 300 is thermally connected to both the electric motor 334 and the bearing 340/sump 346, in other embodiments, the thermal management system of the BLI fan 300 may not be thermally connected to both. Moreover, although the thermal connection to the electric motor 334 is shown as a plurality of coils around the motor 334, in other embodiments, the thermal management system may instead be thermally connected in any other suitable manner.

Figure 9:
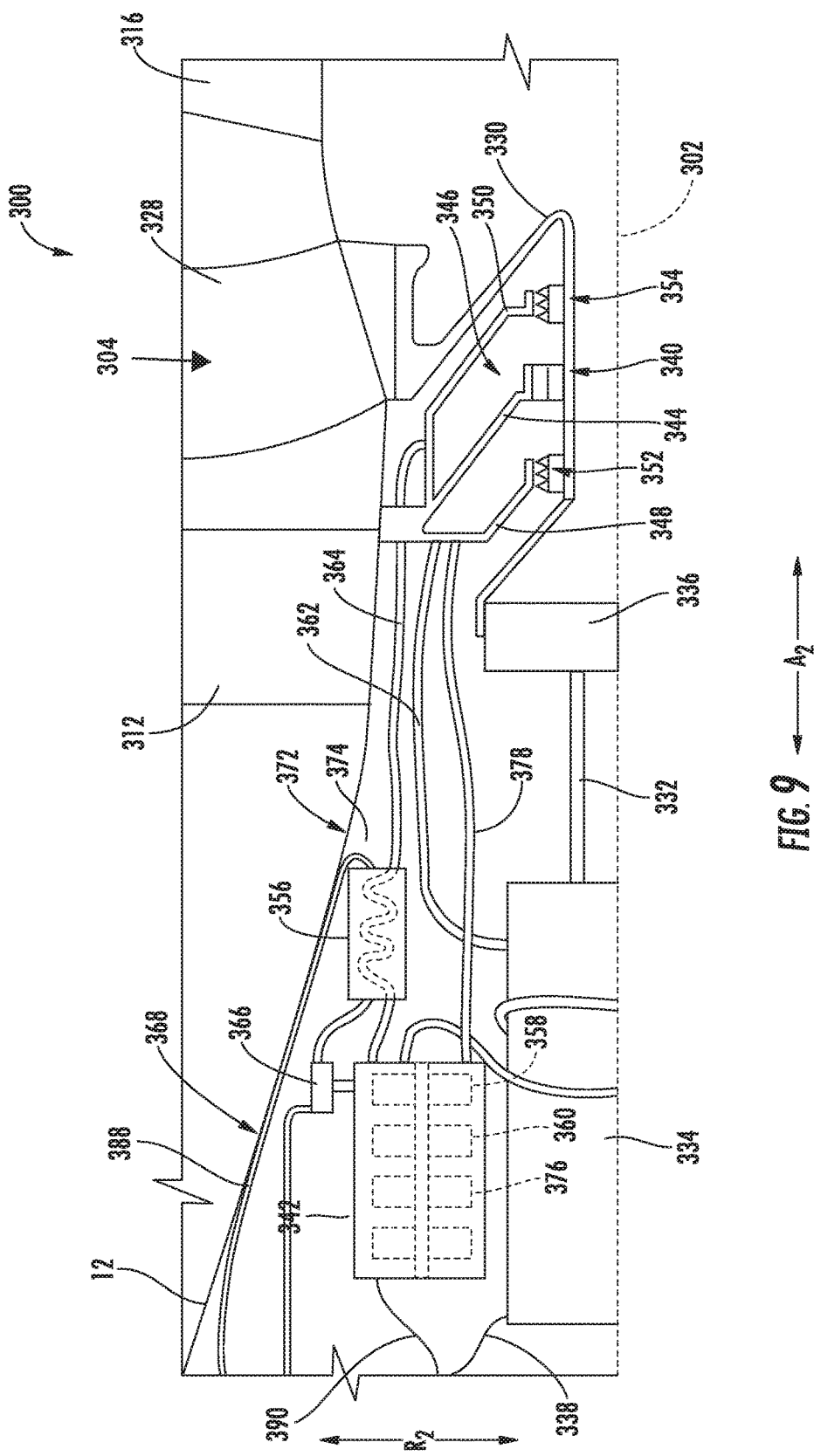
FIG. 9 is a close up, schematic, cross-sectional view of an aft engine in accordance with still another exemplary embodiment of the present disclosure.

Referring now to FIG. 9, a close-up, side, schematic view of a BLI fan 300 in accordance with another exemplary embodiment of the present disclosure is depicted. The exemplary BLI fan 300 depicted in FIG. 9 may be configured in substantially the same manner as exemplary BLI fan 300 depicted in FIG. 5, and accordingly, the same or similar numbers may refer to the same or similar parts.

As is depicted, the BLI fan 300 of FIG. 9 generally includes an electric motor 334 drivingly connected to a fan 304 through a power gearbox 342. The fan 304 includes a fan shaft 330, which is supported by a bearing 340 attached to a structural member 344 of the BLI fan 300. The bearing 340 is enclosed within a sump 346 defined by a forward sump wall 348 and an aft sump wall 350. The BLI fan 300 additionally includes a thermal management system for providing lubrication oil to, and scavenging lubrication oil from, the bearing 340 and the sump 346. As with the exemplary thermal management system described above with reference to FIG. 5, the exemplary thermal management system depicted in FIG. 9 additionally includes a lubrication oil circulation assembly, the lubrication oil circulation assembly including lubrication oil supply pump 358 and a lubrication oil scavenge pump 360. Also for the embodiment depicted, the lubrication oil supply and scavenge pumps 358, 360 are positioned within and driven by an accessory gearbox 342.

Additionally, the thermal management system of the BLI fan 300 includes a heat exchanger 356 in thermal communication with the lubrication oil circulation assembly. However, for the embodiment depicted, the heat exchanger 356 is instead configured as a liquid to lubrication oil heat exchanger. For example, in certain exemplary embodiments, the heat exchanger 356 may be configured as part of a thermal management bus 388 of the aircraft 10. The thermal management bus 388 may thermally connect various heat sources and heat sinks of the aircraft through a common thermal fluid flowing therethrough. The thermal fluid may be an oil, or alternatively may be a cryogenic fluid or phase change fluid, for example when the thermal management bus 388 operates under a refrigeration cycle. Accordingly, the heat exchanger 356 depicted in FIG. 9 may be configured as a thermal fluid to lubrication oil heat exchanger.

Referring still to FIG. 9, the exemplary accessory gearbox 342 depicted is not mechanically coupled to or driven directly by the electric motor 334. Instead, for the embodiment depicted, the accessory gearbox 342 is electrically connected to a power source through an electric line 390. The electric line 390 may be electrically connected to, e.g., the electrical communication bus 111 described above with reference to FIGS. 1 and 2. Accordingly, in certain embodiments, the electric motor 334 and the accessory gearbox 342 may each be driven by an electric generator driven by a gas turbine engine, such as one or both of the jet engines 102, 104. Additionally, or alternatively, the exemplary accessory gearbox 342 of the BLI fan 300 depicted in FIG. 9 may be configured to receive electrical power from an electrical machine of a separate gas turbine engine. For example, referring to FIG. 3, the accessory gearbox 342 of the BLI fan 300 may be in electrical communication with the electrical machine (which may be configured as an electric generator) of the accessory gearbox 246 of the turbofan engine 200.

It should be appreciated, however, that in other exemplary embodiments, the BLI fan 300 may not include the accessory gearbox 342. For example, referring now briefly to FIG. 10, a close-up, side, schematic view of a BLI fan 300 in accordance with another exemplary embodiment of the present disclosure is depicted. The exemplary BLI fan 300 depicted in FIG. 10 may be configured in substantially the same manner as exemplary BLI fan 300 depicted in FIG. 9, and accordingly, the same or similar numbers may refer to the same or similar parts. However, for the embodiment of FIG. 6, each of the accessory systems (e.g., the lubrication oil supply and scavenge pumps 358, 360, the pressurization pump 376, and the secondary electrical machine 382) are each separately powered by an electric power source of the aircraft via an electric line 390. For example, for the embodiment depicted, each of the plurality of accessory systems include a dedicated electric motor for powering the accessory system in electrical communication with power source via electric line 390. It should be appreciated, however, that in still other exemplary embodiments, one or more of the plurality of accessory systems may additionally or alternatively be powered by the electric motor 334, e.g., one or more of the plurality of accessory systems may additionally or alternatively be independently mechanically coupled to the electric motor 334.

A propulsion system including an electric propulsion engine in accordance with one or more embodiments of the present disclosure may allow for a more independently configured electrical propulsion engine less dependent on secondary/accessory systems of other propulsion engines. For example, a propulsion system including an electric propulsion engine in accordance with one or more embodiments of the present disclosure may allow for the electric propulsion engine to include a dedicated thermal management system, accessory gearbox, and other secondary systems, such that the engine is less dependent on other accessory systems of the aircraft. Such a configuration may allow for the electric propulsion engine to be located at, e.g., remote locations on the aircraft, such as at an aft end of the aircraft.

Figure 10:
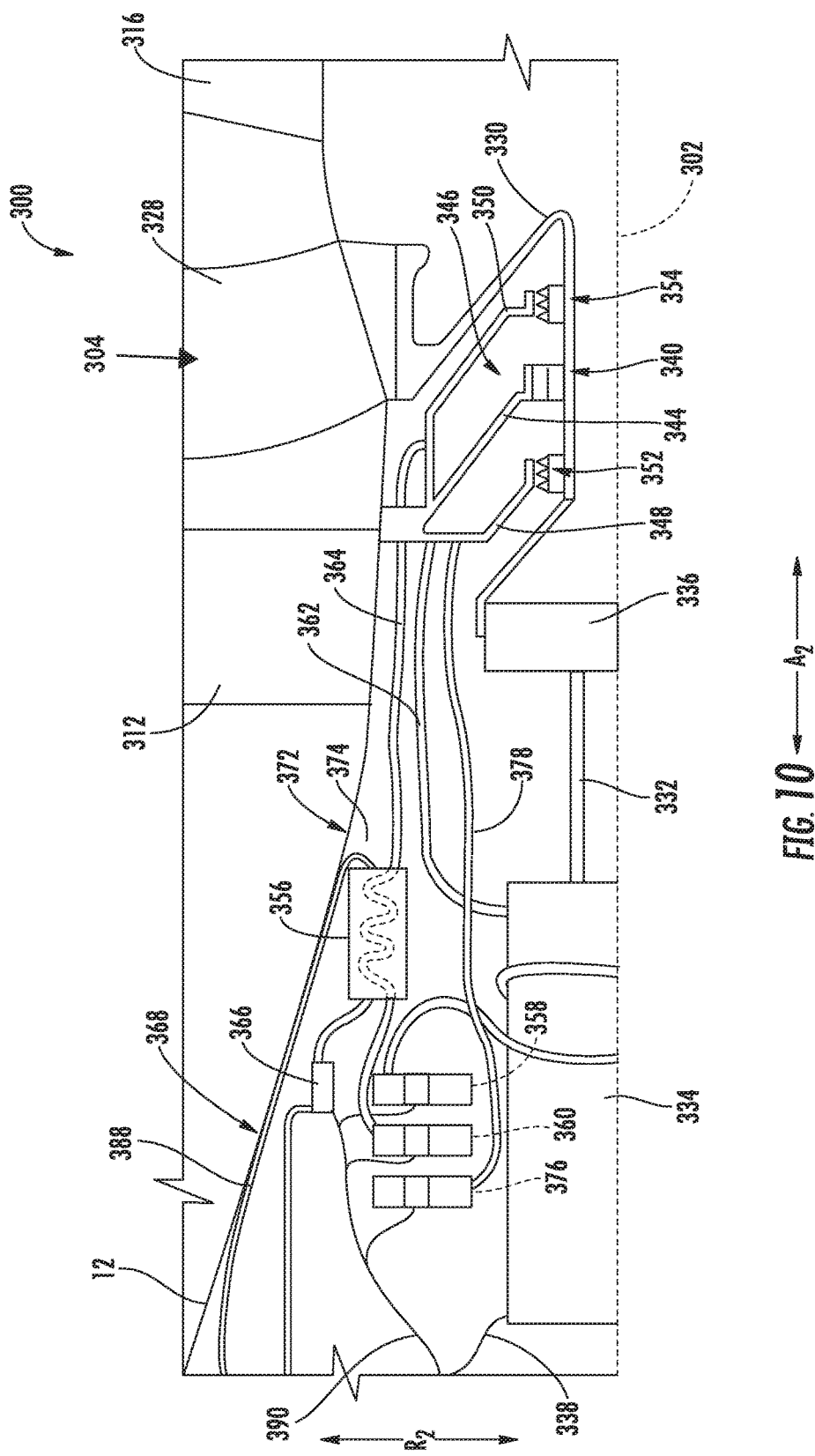
FIG. 10 is a close up, schematic, cross-sectional view of an aft engine in accordance with yet another exemplary embodiment of the present disclosure.
Figure 11:
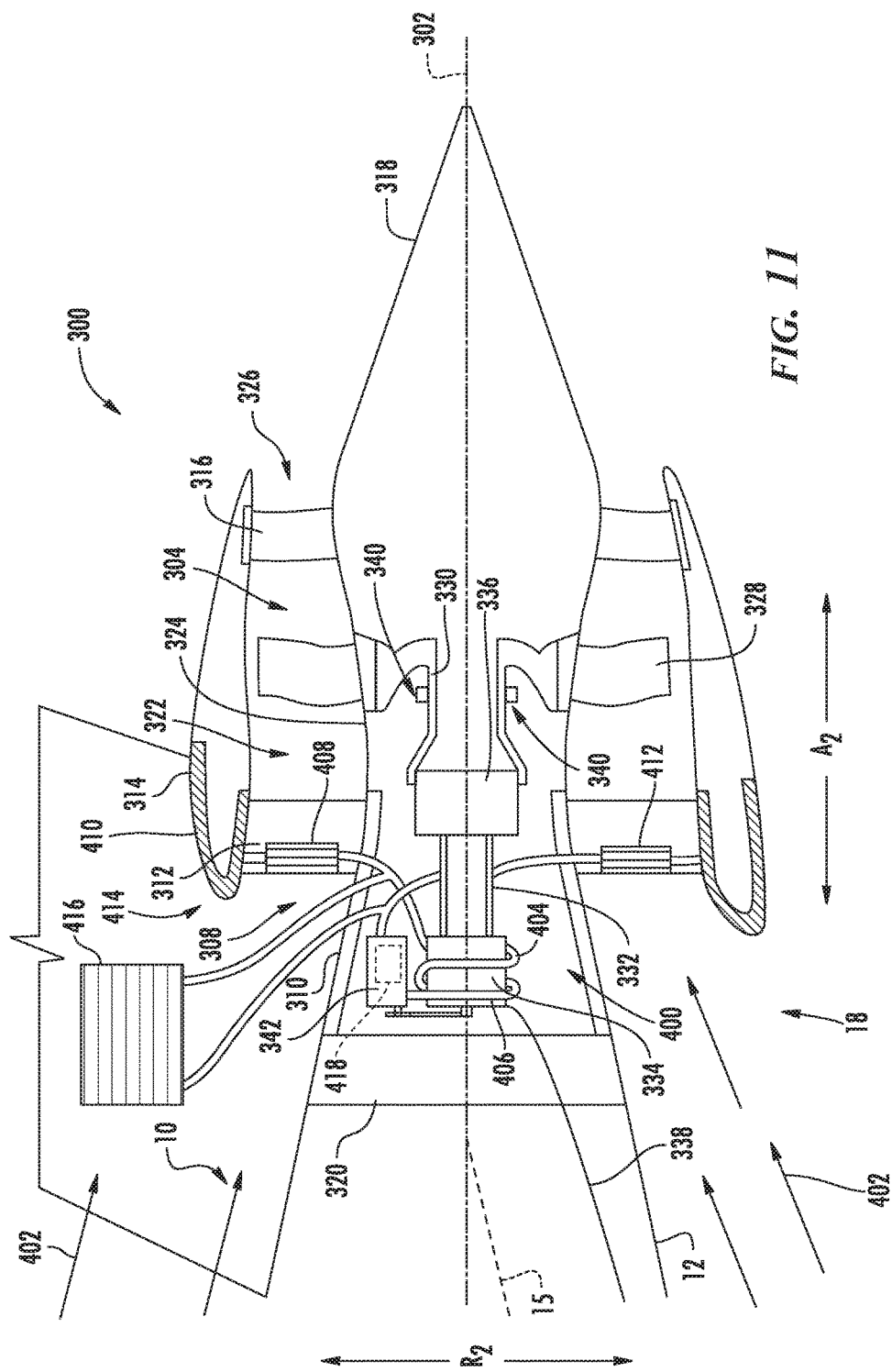
FIG. 11 is a close up, schematic, cross-sectional view of an aft engine in accordance with still another exemplary embodiment of the present disclosure.

Referring now to FIGS. 10 and 11, close-up, side, schematic views of BLI fans 300 in accordance with other exemplary embodiments of the present disclosure are depicted. The exemplary BLI fans 300 depicted in FIGS. 10 and 11 may be configured in substantially the same manner as exemplary BLI fan 300 depicted in FIG. 5, and accordingly, the same or similar numbers may refer to the same or similar parts.

As is depicted, the BLI fans 300 of FIGS. 10 and 11 each generally include an electric motor 334 drivingly connected to a fan 304 through a power gearbox 336. The fan 304 is rotatable about a centerline axis 302. The BLI fans 300 of FIGS. 10 and 11 each also include a fan frame 308, the fan frame 308 generally including an inner frame support 310, a plurality of forward support members 312, an outer nacelle 314, a plurality of aft support members 316, and a tail cone 318. As is depicted, the inner frame support 310 is attached to a bulkhead 320 of the fuselage 12. The plurality of forward support members 312 are attached to the inner frame support 310 and extend outward generally along the radial direction R2 to the nacelle 314. The nacelle 314 defines an airflow passage 322 with an inner casing 324 of the BLI fan 300, and at least partially surrounds the fan 304.

Moreover, for the embodiments depicted, each of the BLI fans 300 depicted in FIGS. 10 and 11 include a cooling system 400 operable with an airflow 402 over the aft end 18 of the aircraft 10 for cooling one or more components of the respective BLI fan 300.

Referring particularly to FIG. 11, the cooling system 400 is configured to cool the electric motor 334 during operation BLI fan 300. More specifically, for the embodiment depicted, the cooling system 400 includes a closed loop 404 configured to flow a thermal transfer fluid therethrough. In certain embodiments, the thermal transfer fluid may be a lubrication oil, a refrigerant, or any other suitable fluid capable of transferring thermal energy. Additionally, the closed loop 404 of the exemplary cooling system 400 depicted forms a plurality of thermal transfer ducts 406 positioned in thermal communication with the electric motor 334. For example, the thermal transfer ducts 406 may, as in the embodiment depicted, extend around an exterior surface of the electric motor 334. Accordingly, for the embodiment depicted, the thermal transfer ducts 406 may be referred to as coils. Additionally, or alternatively, the thermal transfer ducts 406 may include one or more portions extending through or into an interior portion of the electric motor 334. For example, the thermal transfer ducts 406 may include one or more sealed passageways or microchannels extending through the electric motor 334. In still other embodiments, the thermal transfer ducts 406 may additionally or alternatively include heat pipes. The plurality of thermal transfer ducts 406 are configured to reduce a temperature of the electric motor 334 during operation the BLI fan 300 by accepting heat from the electric motor 334 and transferring such heat to the thermal transfer fluid flowing therethrough. The exemplary cooling system 400 depicted further includes a heat exchanger in thermal communication with the thermal transfer fluid within the closed loop 404 and with the airflow 402 over the aft end 18 of the aircraft 10. The heat exchanger is configured for removing heat from the thermal transfer fluid within the closed loop 404. More specifically, the exemplary cooling system 400 depicted includes a first support member heat exchanger 408, a nacelle heat exchanger 410, and a second support member heat exchanger 412. The first and second support member heat exchangers 408, 412 are integrated into a surface of respective forward support members 312. Similarly, the nacelle heat exchanger 410 is integrated into a surface of the outer nacelle 314. Particularly for the embodiment depicted, the outer nacelle 314 includes a forward tip 414 and the nacelle heat exchanger 410 is integrated into a surface of the forward tip 414 of the outer nacelle 314. Such a configuration may allow for the nacelle heat exchanger 410 to provide de-icing benefits to the outer nacelle 314 during operation. Additionally, although not depicted, in certain embodiments, the nacelle heat exchanger 410 may extend along an entire circumference of the outer nacelle 314 (i.e., may extend substantially continuously along the circumferential direction C2).

Referring still to FIG. 11, the exemplary aircraft 10 includes a stabilizer and the exemplary cooling system 400 depicted further includes a heat exchanger configured for integration into the stabilizer. More particularly, the exemplary aircraft 10 depicted includes a vertical stabilizer 30 at the aft end 18 of the aircraft 10 and the cooling system 400 depicted further includes a stabilizer heat exchanger 416 integrated into a surface of the vertical stabilizer 30 for transferring heat to the airflow 402 over the aft end 18 of the aircraft 10. As is depicted, the closed loop 404 of the cooling system 400 branches off downstream of the thermal transfer ducts 406 to extend to the stabilizer heat exchanger 416 and returns at a location upstream of the thermal transfer ducts 406.

In order to provide a flow of the thermal transfer fluid through the closed loop 404 of the cooling system 400, the exemplary cooling system 400 further includes a pump. More specifically, the cooling system 400 includes a pump 418 positioned within and driven by an accessory gearbox 342 of the BLI fan 300. The exemplary accessory gearbox 342 depicted is dedicated to the BLI fan 300. Additionally, for the embodiment depicted, the accessory gearbox 342, and thus the pump 418, is driven by the electric motor 334. However, in other embodiments, the accessory gearbox 342 may instead be powered directly by a suitable electrical power source of the aircraft 10 and/or one or more aircraft engines. Additionally, in still other embodiments, the pump 418 may be a standalone pump mechanically or electrically powered by any suitable source.

It should be appreciated that although for the embodiment depicted the pump 418 and closed loop 404 of the cooling system 400 are depicted being independent of any other accessory system, in other embodiments, the pump 418 and closed loop 404 may be operable with one or more of the exemplary thermal management systems described above with reference to FIGS. 5 through 9. For example, in certain embodiments, the closed loop 404 may be fluidly connected with (or simply an extension of) one of the lubrication oil supply line 362 or lubrication oil scavenge line 364 (in which case, the pump 418 may be the same, or operable with, one or both of the lubrication oil supply or scavenge pumps 358, 360 (see, e.g., FIG. 5).

During operation of the BLI fan 300, and the cooling system 400, the pump 418 may pressurize a thermal transfer fluid within the closed loop 404, generating a flow of the thermal transfer fluid through the closed loop 404. The thermal transfer fluid may flow through the thermal transfer ducts 406, where the thermal transfer fluid accepts heat from the electric motor 334, reducing a temperature of the electric motor 334. The thermal transfer fluid may then flow towards the plurality of heat exchangers. A first portion of the thermal transfer fluid may flow from the thermal transfer ducts 406 through the first support member heat exchanger 408, through the nacelle heat exchanger 410 (and around the outer nacelle 314), through the second support member heat exchanger 412, and back towards the pump 418. A second portion of the thermal transfer fluid may simultaneously flow from the thermal transfer ducts 406 through the stabilizer heat exchanger 416, and back towards the pump 418. A temperature of the first and second portions of the thermal transfer fluid may be reduced when flowing through the various heat exchangers, by exchanging heat with the airflow 402 over the aft and the aircraft 10.

It should be appreciated, however, that in other embodiments, the cooling system 400 may have any other suitable configuration. For example, in other embodiments, the cooling system 400 may not include each of the various heat exchangers depicted in FIG. 11. Additionally, or alternatively, the exemplary cooling system 400 may include any other suitable configuration of heat exchanger(s). For example, in other embodiments, the cooling system 400 may include one or more heat exchangers integrated into a surface 38 of the fuselage 12, integrated into a surface of the tail cone 318, integrated into a surface of an aft support member 316, or positioned at any other suitable location for transferring heat to the airflow 402 over the aft end 18 of the aircraft 10. Further still, in other embodiments, the cooling system 400 may additionally include any other suitable type of heat exchangers, such as a fuel-oil heat exchanger, an oil-oil heat exchanger, a hydraulic fluid-oil heat exchanger, a hydraulic fluid-oil heat exchanger, etc.

Moreover, in still other exemplary embodiments, the closed loop 404 of the exemplary cooling system 400 may be configured to provide a flow of the thermal transfer fluid through one or more heat exchangers in a parallel flow configuration, in a series flow configuration, or in a combination thereof (such as in the embodiment depicted).

Referring now particularly to the exemplary BLI fan 300 of FIG. 12, the cooling system 400 is similarly operable with an airflow 402 over the aft end 18 of the aircraft 10 and configured to cool the electric motor 334 during operation of the BLI fan 300.

However, for the embodiment depicted, the exemplary cooling system 400 depicted is a direct, air-cooled cooling system. For example, the exemplary cooling system 400 generally includes a cooling air duct 420 defining an inlet 422 and an outlet, and extending at least partially over or adjacent to the electric motor 334. The inlet 422 is configured to receive at least a portion of the airflow 402 over the aft end 18 of the aircraft 10 as a cooling airflow 426. More specifically, for the embodiment depicted, the inlet 422 of the cooling air duct 420 is positioned on a fuselage 12 of the aircraft 10, at a location upstream from, and forward of, the fan 304. Accordingly, the inlet 422 is in airflow communication with a location outside of the aircraft 10 and forward of the fan 304. Further, for the embodiment depicted, the inlet 422 is also located forward of the electric motor 334. Although not depicted, the exemplary cooling system 400 may include a fixed or variable geometry scoop or lip at the inlet 422 extending outwardly into the airflow 402 for ensuring a desired amount of such airflow 42 is received as cooling airflow 426 in the cooling air duct 420. Additionally, in certain embodiments, the cooling system 400 may include an air filter mechanism 427 extending across the air duct 420 for filtering any particulates or other matter from the cooling airflow 426 within the cooling air duct 420.

The airflow 402 over the aft end 18 of the aircraft 10 may be received in the cooling air duct 420 through the inlet 422 of the cooling air duct 420 and provided to a cavity 428 defined by the cooling air duct 420, the cavity 428 thermally connecting the cooling airflow 426 within the cooling air duct 420 to the electric motor 334. More specifically, the exemplary cavity 428 depicted surrounds at least a portion of the electric motor 334 and allows for the cooling airflow 426 through the cooling air duct 420 to be exposed directly to at least a portion of the electric motor 334. The cooling airflow 426 may accept heat from the electric motor 334, reducing a temperature of the electric motor 334. In certain embodiments, the cooling airflow 426 may be directed to an interior of the electric motor 334 to specifically cool certain components of the electric motor 334 (not shown; e.g., a rotor and/or a stator). However, in other embodiments, the cooling airflow 426 may be limited to the exterior of the electric motor 334. In certain embodiments, the cooling system 400 and/or the electric motor 334 may include features for enhancing a heat transfer from the electric motor 334 to the cooling airflow 426. For example, although not depicted, the electric motor 334 may include one or more fins, pins, turbulators, etc.

The cooling airflow 426, after having received heat from the electric motor 334, may then continue through the cooling air duct 420 to the outlet. For the embodiment depicted, the cooling air duct 420 includes a first outlet 430 and a second outlet 432. The first outlet 430 is positioned on one of the forward support members 312 and is configured to provide at least a portion (e.g., a first portion 434) of the cooling airflow 426 through the cooling air duct 420 to the fan 304. Notably, inclusion of the outlet 430 on the forward support member 312 (which may be shaped as an airfoil) may allow for providing an amount of control over the airflow 426 through the air duct 420. For example, placement of the outlet 430 on the forward support member 312 may allow for inducing the airflow 426 through the air duct 420. Additionally, the exemplary cooling air duct 420 includes the second outlet 432 located on a radially outer side of the outer nacelle 314. Accordingly, for the embodiment depicted, the cooling air duct 420 additionally extends through the forward support member 312 to the outer nacelle 314 and exhausts at least a portion (e.g., a second portion 436) of the cooling airflow 426 through the outer nacelle 314. Notably, with such a configuration, the second portion 436 of the cooling airflow 426 may be at a relatively high pressure compared to a boundary layer air over the radially outer side of the outer nacelle 314. Accordingly, exhausting the second portion 436 of air to through the outer nacelle 314 may reduce a drag generated by the outer nacelle 314.

Furthermore, the exemplary embodiment depicted in FIG. 12 includes a fan 438 positioned at least partially within the cooling air duct 420 for assisting in providing an airflow through the cooling air duct 420. The fan 438 of the exemplary cooling system 400 depicted in FIG. 12 is mechanically driven by the electric motor 334 through a geartrain. However, in other embodiments, the fan 438 may instead be powered by any suitable mechanical or electrical power source. Alternatively still, in other embodiments, the cooling system 400 may not include a fan, and instead may rely on a pressure differential between the inlet 422 of the cooling duct 420 and the outlet (e.g., the first outlet 430 or second outlet 432) of the cooling duct 420 to generate the flow of cooling airflow 426 therethrough.

Notably, for the embodiment of FIG. 12, the inlet 422 is depicted as a single, relatively large inlet, and the outlets are each depicted as a single, relatively large outlet. However, in other embodiments, the inlet 422 may instead be formed of a plurality of relatively small openings or apertures on the fuselage 12 of the aircraft 10 and, similarly, the one or both of the outlets 430, 432 may be configured as a plurality of relatively small openings or apertures in, e.g., one or more of the support members 312, the outer nacelle 314, etc. Further, although positioned on an under side of the fuselage 12 of the aircraft 10 depicted in FIG. 12, in other embodiments, the inlet 422 may additionally or alternatively be positioned at any other suitable location on the fuselage 12 of the aircraft 10 (e.g., a top side, a port side, and/or a starboard side), or elsewhere. For example, in other embodiments, the inlet 422 of the cooling air duct 420 may be in airflow communication with a location downstream of the fan 304 of the BLI fan 300 (e.g., at the nozzle section 326), so as to receive a relatively high pressure air for generating an airflow through the cooling air duct 420. Further, although the cooling air duct 420 depicted include a first outlet 430 on a structural member and a second outlet 432 on the outer nacelle 314, in other embodiments, the cooling air duct 420 may only include outlets on one or more structural members, on the outer nacelle 314, or at any other suitable location.

Moreover, in other embodiments, the cooling system 400 may include aspects of the exemplary cooling system 400 described above with reference to FIG. 11, in addition to aspects of the exemplary cooling system 400 described above with respect to FIG. 12. For example, in other exemplary embodiments, the cooling system 400 may include both a closed loop 404 (and, e.g. one or more heat exchangers, coils 406, etc.) and a cooling air duct 420 providing a cooling airflow over the electric motor 334.

Moreover, still, in other embodiments, the exemplary cooling system 400 described with reference to FIG. 12 may be utilized in combination with one or more of the exemplary thermal management systems described above with reference to FIGS. 5 through 9. For example, in certain exemplary embodiments, the cooling airflow 426 in the duct 420 may be in thermal communication with one or more of the heat exchangers of the exemplary thermal management systems described above with reference to FIGS. 5 through 9.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A propulsion system for an aircraft having an aft end, the propulsion system comprising:
    an electric propulsion engine defining a central axis, the electric propulsion engine comprising:
    an electric motor;
    a fan rotatable about the central axis of the electric propulsion engine by the electric motor;
    a bearing supporting rotation of the fan;
    an accessory gear box dedicated to the electric propulsion engine, and
    a thermal management system comprising:
        a lubrication oil circulation assembly for providing the bearing with lubrication oil, wherein the lubrication oil circulation assembly comprises a lubrication oil supply pump and a lubrication oil scavenge pump, and wherein the accessory gearbox drives the lubrication oil supply pump and the lubrication oil scavenge pump; and
        a heat exchanger thermally connected to the lubrication oil circulation assembly.

2. The propulsion system of claim 1, wherein the lubrication oil circulation assembly comprises a lubrication oil supply pump and a lubrication oil scavenge pump.

3. The propulsion system of claim 1, further comprising:
    a sump enclosing the bearing, wherein the lubrication oil circulation assembly is fluidly connected to the sump.

4. The propulsion system of claim 1, further comprising:
    an accessory gear box dedicated to the electric propulsion engine.

5. The propulsion system of claim 4, wherein the accessory gear box is driven by the electric motor.

6. The propulsion system of claim 4, further comprising:
    a sump enclosing the bearing; and
    a pressurization pump for pressurizing the sump, wherein the accessory gearbox drives the pressurization pump.

7. The propulsion system of claim 4, wherein the accessory gearbox includes a secondary electrical machine.

8. The propulsion system of claim 4, wherein the heat exchanger is an air cooled oil cooler.

9. The propulsion system of claim 8, wherein the accessory gearbox drives a blower for providing an airflow through the air cooled oil cooler.

10. The propulsion system of claim 4, further comprising:
    a gas turbine engine; and
    an electric generator driven by the gas turbine engine, the electric generator providing electrical power to the electric motor and the accessory gearbox.

11. The propulsion system of claim 4, further comprising:
    a gas turbine engine having a dedicated accessory gearbox, wherein the dedicated accessory gearbox of the gas turbine engine comprises an electrical machine configured to generate electrical power, and wherein the accessory gearbox of the electric propulsion engine is configured to receive electrical power from the electrical machine of the accessory gearbox of the gas turbine engine.

12. The propulsion system of claim 1, wherein the electric propulsion engine is configured as a boundary layer ingestion aft fan configured to be mounted along a mean line of the aircraft at the aft end of the aircraft.

13. The propulsion system of claim 1, further comprising:
    a cooling system operable with an airflow over an aft end of the aircraft when the electric propulsion engine is mounted to the aircraft, the cooling system configured to cool the electric motor during operation of the electric propulsion engine.

14. The propulsion system of claim 13, wherein the cooling system is further operable with the thermal management system.

15. The propulsion system of claim 1, wherein the heat exchanger is a thermal fluid to lubrication oil heat exchanger.

* * * * *

UNITED STATES PATENT AND TRADEMARK OFFICE
CERTIFICATE OF CORRECTION

PATENT NO. : 10,676,205 B2  
APPLICATION NO. : 15/241157  
DATED : June 9, 2020  
INVENTOR(S) : Daniel Alan Niergarth et al.

Page 1 of 1

It is certified that error appears in the above-identified patent and that said Letters Patent is hereby corrected as shown below:

In the Claims

Claim 5, Column 20, Line 20, delete "claim 4" and insert -- claim 1 --

Claim 6, Column 20, Line 22, delete "claim 4" and insert -- claim 1 --

Claim 7, Column 20, Line 26, delete "claim 4" and insert -- claim 1 --

Claim 8, Column 20, Line 28, delete "claim 4" and insert -- claim 1 --

Claim 9, Column 20, Line 30, delete "claim 4" and insert -- claim 1 --

Claim 10, Column 20, Line 33, delete "claim 4" and insert -- claim 1 --

Claim 11, Column 20, Line 38, delete "claim 4" and insert -- claim 1 --

Signed and Sealed this  
Twelfth Day of April, 2022

Drew Hirshfeld  
*Performing the Functions and Duties of the*  
*Under Secretary of Commerce for Intellectual Property and*  
*Director of the United States Patent and Trademark Office*